(12) United States Patent
Camiel

(10) Patent No.: US 9,177,164 B2
(45) Date of Patent: Nov. 3, 2015

(54) SYSTEM AND METHOD FOR A PARALLEL WORLD OF SECURITY FOR NON SECURE ENVIRONMENTS

(71) Applicant: Noam Camiel, Tel Aviv (IL)

(72) Inventor: Noam Camiel, Tel Aviv (IL)

(*) Notice: Subject to any disclaimer, the term of this patent is extended or adjusted under 35 U.S.C. 154(b) by 0 days.

(21) Appl. No.: 14/231,482

(22) Filed: Mar. 31, 2014

(65) Prior Publication Data

US 2014/0373172 A1 Dec. 18, 2014

Related U.S. Application Data

(60) Provisional application No. 61/806,903, filed on Mar. 31, 2013.

(51) Int. Cl.
| | |
|---|---|
| *G06F 21/84* | (2013.01) |
| *G06F 21/60* | (2013.01) |
| *G06F 21/45* | (2013.01) |
| *G06F 21/62* | (2013.01) |
| *G06F 12/10* | (2006.01) |

(52) U.S. Cl.
CPC .............. *G06F 21/604* (2013.01); *G06F 21/45* (2013.01); *G06F 21/62* (2013.01)

(58) Field of Classification Search
CPC . G09G 2370/24; G06F 1/1671; G06F 3/0219; G06F 3/0238; G06F 3/0489; G06F 15/0225; G06F 21/83; G06F 21/84; G06F 1/1601; G06F 3/01
See application file for complete search history.

(56) References Cited

U.S. PATENT DOCUMENTS

| | | | | |
|---|---|---|---|---|
| 6,134,661 | A | * | 10/2000 | Topp ............................... 726/18 |
| 2003/0044013 | A1 | * | 3/2003 | Mukogawa .................... 380/255 |
| 2006/0036731 | A1 | * | 2/2006 | Mossman et al. ............. 709/225 |
| 2006/0101128 | A1 | * | 5/2006 | Waterson ...................... 709/212 |
| 2007/0061592 | A1 | * | 3/2007 | Nian .............................. 713/189 |
| 2008/0048986 | A1 | * | 2/2008 | Khoo ............................ 345/168 |
| 2010/0115290 | A1 | * | 5/2010 | Walch et al. .................. 713/190 |
| 2011/0119484 | A1 | * | 5/2011 | Jallad et al. ................... 713/155 |
| 2011/0227830 | A1 | * | 9/2011 | Chun ............................ 345/168 |
| 2013/0346903 | A1 | * | 12/2013 | Puppin ......................... 715/773 |
| 2014/0359785 | A1 | * | 12/2014 | Chandra ......................... 726/27 |

OTHER PUBLICATIONS

An In-Depth Analysis of the Epitome of Online Stealth:Keyloggers; and Their Countermeasures. Vishnani et al. ACC(2011).*

* cited by examiner

*Primary Examiner* — Venkat Perungavoor

(57) ABSTRACT

A system and method is introduced for combining a secure device with a non secure user machine for using and sharing secure data seamlessly through the non secure user machine. The secure device runs in a separate, "parallel world" to the user machine so that the user machine cannot access secure data while it is being used. Even if the user machine is already compromised, the secure data and its usage remain protected from the likes of key logging and screen captures. The secure device authenticates secure data handling to the user so that the user is able to differentiate between a secure and a non secure data usage, as well as identify false imitations of the secure environment.

33 Claims, 13 Drawing Sheets

SYSTEM AND METHOD FOR A PARALLEL WORLD OF SECURITY FOR NON SECURE ENVIRONMENTS

CROSS-REFERENCE TO RELATED APPLICATIONS

This application claims the benefit of U.S. Provisional Patent Ser. No. 61/806,903, filed Mar. 31, 2013 by the present inventor.

FIELD OF INVENTION

This invention generally relates to the securing of data while allowing the use of the secure data, and more particularly but not exclusively to securing and sharing data securely through non secure environments.

BACKGROUND OF THE INVENTION

Protecting data in a computing environment that is connected to the network has become a challenge in light of cyber attacks and inside jobs. The key forms of security that were relied upon just a few years ago, such as physical security and encryption, are now bypassed successfully by attackers.

The situation gets worse when such attacks remain unknown for a certain period of time or perhaps even indefinitely. It is therefore difficult to state anything about the security of a machine that is connected to the internet. Simple questions regarding security can no longer be answered: "has the machine been compromised?", "Is the data I'm typing or viewing now safe from interception?", "Has my data been altered without my knowledge?"

The reality is that if a machine is connected to the network then there is no guarantee regarding the security of the machine, and once a security breach occurs, all assets on that machine can be comprised. It is worth noting that even a machine that is not directly connected to the network or even unconnected machines can be compromised in various ways through a combination of cyber security and insiders.

In the attempt to defend against such attacks, there is an asymmetry between the role of the defender of a network and the attacker. The defender maintains current security infrastructure, going through logs trying to identify a possible threat, patching security fixes, adding layers of security and monitoring the machine and network for possible potential threats.

The attacker searches for a single weakness and uses that weakness to gain access to the user data.

The present invention presents a different approach to protecting data from cyber attacks and inside attacks. In this disclosure we present a "parallel world" of security or a parallel environment to the user unauthenticated, non secure environment which is usable yet secured and isolated. The "worlds", the parallel and the non secure one, never intersect so that what is secured remains secure and the rest, the non secure, unauthenticated data, stays out of the secure world. The two "worlds" are both controlled through the non secure user environment so that the user has a seemingly single, standard environment experience.

Since the parallel worlds never intersect, if a data breach occurs in the non secure user machine, the sensitive data on the parallel world remains secure and can be used through the use machine even when the user machine is compromised, without risking the secure data.

In order to prevent the user from mistaking between secure data handling and non secure, normal data handling on the user machine, the parallel world authenticates itself to the user so that the user can tell the secure parallel world is currently in use, rather than a non secure one. This can protect the user from an imitation created by an attacker, or protect even from just a standard, non secure unauthenticated application that the user can type secure data into by mistake.

The parallel world can protect various types of sensitive data such as documents, emails, code, images, videos; Data may be shared between parallel world entities; Sensitive data entry such as authenticating with username password to a website; Editing of documents, emails and code; Protecting data usage on cloud computing and so forth.

The usage of the protected data is transparent to the user and protected data can be shared and safely sent to other users, yet for example unintended recipients cannot make use of received secure data. Similarly, data is also protected from entities other than users, such as an automated server.

The parallel world adds identification and authentication to users and servers, data can be shares between users securely and communication to a server can be secured.

The parallel world restores the importance of physical security and encryption so that these two, quite old securing methods can become once again the highlight of securing data.

This disclosure presents a way to handle secure data and non-secure data through a common interface while allowing a user to identify secure handling of secure data.

This disclosure aims at protecting secure data even if an intrusion has already occurred, and protects even from an inside data breach.

In this disclosure a secure and isolated environment is created for handling sensitive, secure data so that the data can be used and shared transparently while keeping the data protected. Data is created, used, shared and communicated separately from the non secure user machine and is kept in a secure environment throughout its entire lifetime.

Each user has a secure environment working in parallel to their machine. Data that is considered sensitive is created and used only in that secure environment. User can communicate sensitive data to other users who can use the data using their secure environment. The parallel world can be configured with permissions for single users as well as for groups of users. Similarly, permissions can be managed in that way through individuals and groups.

Some of the motivation of this disclosure is to protect secure data from being copied or intercepted by any means, even through the likes of key loggers and display snapshots. The data is to remains protected from administrators that back up the data for example, so that mass copying of protected data is prevented. The data is to remain protected if sent to the wrong recipient. The data is to be accessed by its intended users only and is to be protected from others throughout the lifetime of the data. Since the secure data remains in the parallel world, mass copying even of authorized data for the user, to a media outside the parallel world is prevented.

There is thus a widely recognized need for protecting data in the manner described above even when the non secure user machine has already been compromised and it would be highly advantageous to have such a method devoid of the above limitations.

SUMMARY OF THE INVENTION

A system and method is presented for using and sharing secure data using a secure environment that authenticates itself to the user. The secure environment can work in conjunction with a non-secure user machine so that user experience is seemingly entirely through the user machine. Secure data is used and remains protected in the secure environment even if the security of the user machine has been compromised.

Furthermore, according to one aspect of the present invention, there is provided a system for handling secure data within a secure device through the control of a user machine, the system comprising:
   said secure device for handling secure data separately from said user machine;
   said user machine sending said secure device commands for use of said secure data;
   display for displaying said user machine and said secure device wherein said secure device display does not pass through said user machine;
whereby said user machine commands the use of secure data without the output display and without secure data passing through said user machine keeping said secure data separate from said user machine According to a second aspect of the present invention, there is provided a secure device for handling secure data for use with a user machine through the control of said user machine the secure device comprising:
   input for receiving commands from said user machine;
   a secure environment for handling secure data separately from said user machine;
   an output for display data for directly displaying secure data together with user machine display data wherein said output of display data does not pass through said user machine;
whereby said user machine commands the use of secure data for use by a user without the output display or secure data passing through said user machine According to a third aspect of the present invention, there is provided a method of using secure data using a secure device through the use of a user machine the method comprising:
   a. requesting to use secure data through said user machine,
   b. using said requested secure data in said secure device according to said user machine commands,
   c. displaying output display of usage of said requested secure data handled in said secure device directly to said user without said output display passing through said user machine.

Unless otherwise defined, all technical and scientific terms used herein have the same meaning as commonly understood by one of ordinary skill in the art to which this invention belongs. The materials, methods, and examples provided herein are illustrative only and not intended to be limiting Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1A:
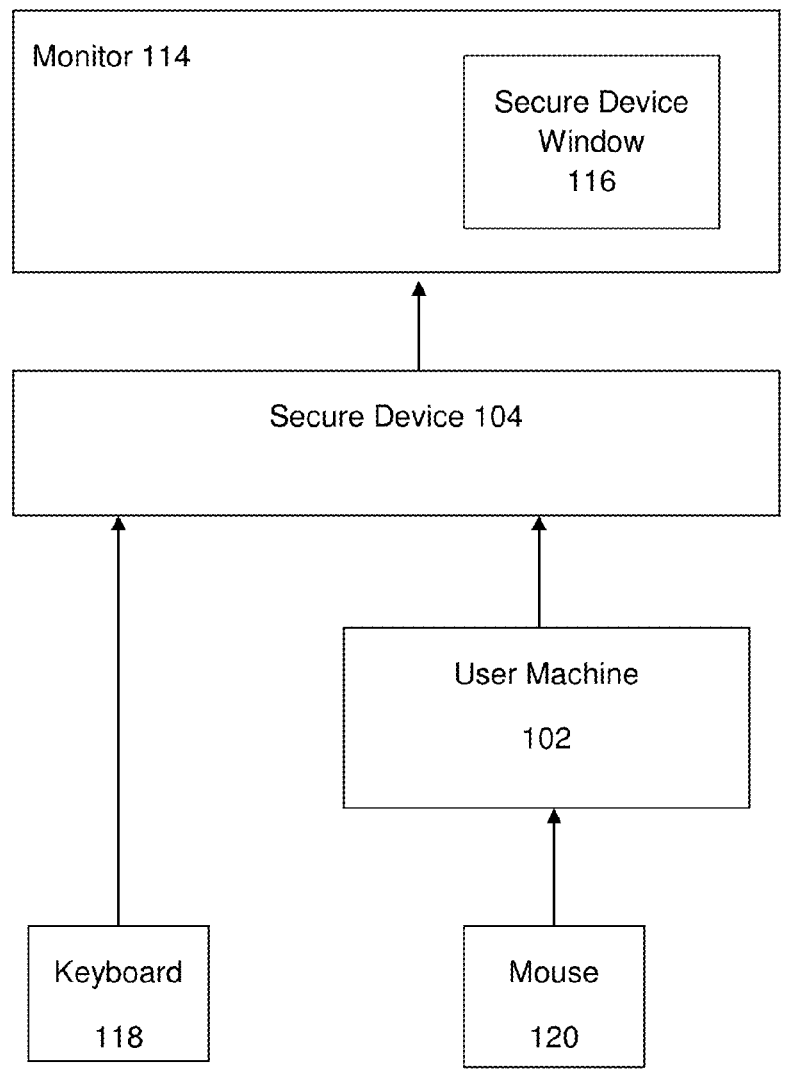
FIG. 1A is a block diagram illustration of a secure device connected to a user machine, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach a secure device for use with a non-secure user machine for using and sharing secured data through the user machine. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using the data securing environment described herein. In this disclosure, a data securing environment is used in conjunction with a non secure user machine for a single environment experience, allowing the use of data protection through a less protected user environment.

The secure environment runs in a separate, "parallel world" to the non secure user machine so that the user environment cannot access secure data while it is being used. Even if the user environment security is breached, the secure data and its usage remain protected from the likes of key logging and screen captures.

In order to let the user differentiate between the secure and non-secure environments, the secure environment authenticates itself to the user. This authentication is also meant to prevent a possible false impersonation of the secure environment by the non secure environment, which may be attempted by a hacker to the non secure user environment.

Once the secure environment authenticates itself to the user, the user can safely create and use secure data without fear of possible leaking of secure data to the non secure environment. The authentication process can be a continuous one or a repeating one, rather than be presented only at a certain time.

The secure data in use by the user can be a wide range of user data such as user personal data as well as shared data between a plurality of users. The secure data can also be communicated with a server having a secure environment as well as be used in cloud environments that has a secure environment. In this manner data can be securely transferred between two or more secure environments.

This disclosure introduces a "parallel world", a secure environment that runs in parallel to the user machine and which does not share any user data with the user machine and yet still allow the control and display of applications making use of the secure data through the user machine. The "parallel world" environment keeps secure data protected from a security-compromised user machine even while secure data is in use. Compromised security can be for example an installation of malware on the user machine or even, a hacker gaining administrator rights on the user machine.

This disclosure presents a way to protect secure data throughout its entire lifetime, from its creation, to its usage and its sharing. The data protection environment described may be included as part of a single device or be presented as a separate device to be connected to the user machine through direct access connections. The data protection device may be a part of a network of data protection devices and one or more servers. There may be a number of such networks of secure devices that are completely or partially separate.

Using this disclosure, the user is offered with a secure environment for creating, viewing editing and sharing sensitive data such as documents; images and videos as well as entering credentials on a web page and sending secure email messages.

This disclosure presents a separation between the secure environment and the non secure environment while working with the non secure environment to control both of the environments. The separation between the environments means that even screen captures and key logging cannot be used to attack the secure data.

This disclosure allows the user to define access permissions to sensitive data for other users and to protect sensitive messages from wrongfully sent recipients;

This disclosure allows the handling of secure data and non-secure data through a common interface while allowing a user to identify secure handling of secure data.

The term user machine used throughout this disclosure may generally refer to a non secure machine such as a computer of a user, a laptop, tablet, smart-phone or any other computing device that may be exposed to external attacks such as through the network.

Reference is now made to FIG. 1A, which is a block diagram illustration of a secure device connected to a user machine, in accordance with an embodiment of the present invention comprising user machine 102 such as a PC, a secure device 104 which is a separate execution environment to the user machine 102. The user machine 102 may pass commands and data as well as user machine display to the secure device 104.

The secure device 104 receives keyboard typing from keyboard 118 and either directs them out to the user machine 102 or cuts off the user machine and directs typing only to the secure device 104. Note connection between secure device 104 to user machine 102 to transfer keyboard data as well as other data is not shown in this fig but does exist.

Mouse 120 connects to the user machine directly and if necessary, the user machine 102 passes mouse commands to the secure device 104.

The secure device 104 outputs data such as display data to the monitor 114. The data transferred from secure device 104 to the monitor 114 may be display data as well as optional other data. The data transferred from secure device 104 to the monitor 114 originates from secure device 104 and may also include data that originates from user machine 102 such as display data to the monitor.

The monitor 114 displays a secure device window 116 originating from secure device 104. The secure device window 116 contains data that does not pass through the user environment and is yet controllable through the user machine through the mouse 120 and keyboard 118 as will be further described. Having secure data usage taking place in an unreachable location from the non secure user machine prevents attacks from the user machine that may attempt to access secure data and its usage.

Figure 1B:
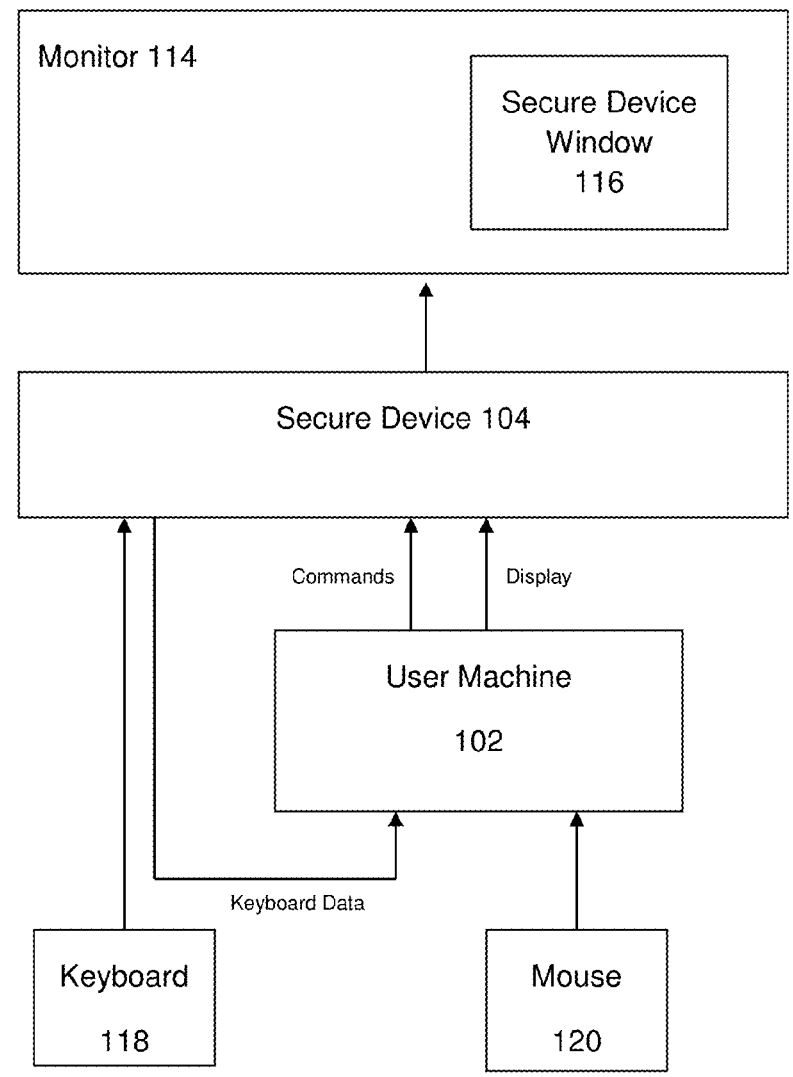
FIG. 1B is a block diagram illustration of a secure device with detailed connection to a user machine, in accordance with an embodiment of the present invention.

Reference is now made to FIG. 1B, which is a block diagram illustration of a secure device with detailed connection to a user machine, in accordance with an embodiment of the present invention comprising non secure user machine 102 such as a PC, a secure device 104 which is a separate execution environment to the user machine 102. The user machine 102 may pass commands and data such as encrypted secure data to the secure device. The user machine passes its display to the secure device 104.

The secure device 104 receives keyboard typing from keyboard 118 and either directs them out to the user machine 102 or cuts off the user machine and directs the typing only to the secure device 104. During secure data usage in secure device 104 the keyboard is cut off from the user machine. This way Key loggers installed on user machine 102 will not be effective during secure data usage in the secure device since keyboard typing does not pass through user machine 102 during secure data usage time.

Mouse 120 connects to the user machine directly and if necessary, the user machine 102 passes mouse commands to the secure device 104. The mouse commands in the present embodiment pass through the user machine during both secure and non secure data usage. In some embodiments the mouse commands during secure data usage may not passed through the user machine similarly to how data from keyboard 118 is not passed through the user machine in secure data usage time. In some embodiments touch screen or other input devices may be relevantly used and keyboard and mouse are used here as an example only and should not be limiting.

The secure device 104 outputs data such as display data to the monitor 114. The data transferred from secure device 104 to the monitor 114 may be display data as well as optional other data, for example audio as well as other data not used by a monitor. The data transferred from secure device 104 to the monitor 114 originates from secure device 104 and may also include data that originates from user machine 102 such as display data to the monitor. The monitor 114 displays a secure device window 116 originating from secure device 104. The secure device window 116 contains data that does not pass through the user environment and is yet controllable through the user machine through the mouse 120 where mouse commands originating from the user machine may be sent to the secure device. Having secure data usage taking place in an unreachable area from the user machine prevents attacks from the user machine to secure data usage.

Secure data is being used only within secure device 104. All secure keyboard typing and secure display data is not passed through the user machine. The secure device 104 forms a "parallel world" to the world of the user machine, which is controllable and usable from the user machine yet no data is shared with the user machine. In some embodiments secure user data is stored in encrypted form outside secure device 104 such as in the user machine and are decrypted when retrieved in secure device 104 during secure data usage.

The user may create, view and edit secure data on his machine 102 using the secure device window 116 displayed from the secure device 104 without the keyboard or display ever going through the user machine. Therefore existence of key loggers and display snapshots on user machine 102 will not be effective in order to intercept secure user data.

It will be later shown how secure device 104 can be effectively protected from tampering from user machine 102 as well as how this protection is fundamentally different from any other currently available protection mechanism, such as firewalls and traffic monitoring devices for example.

Figure 1C:
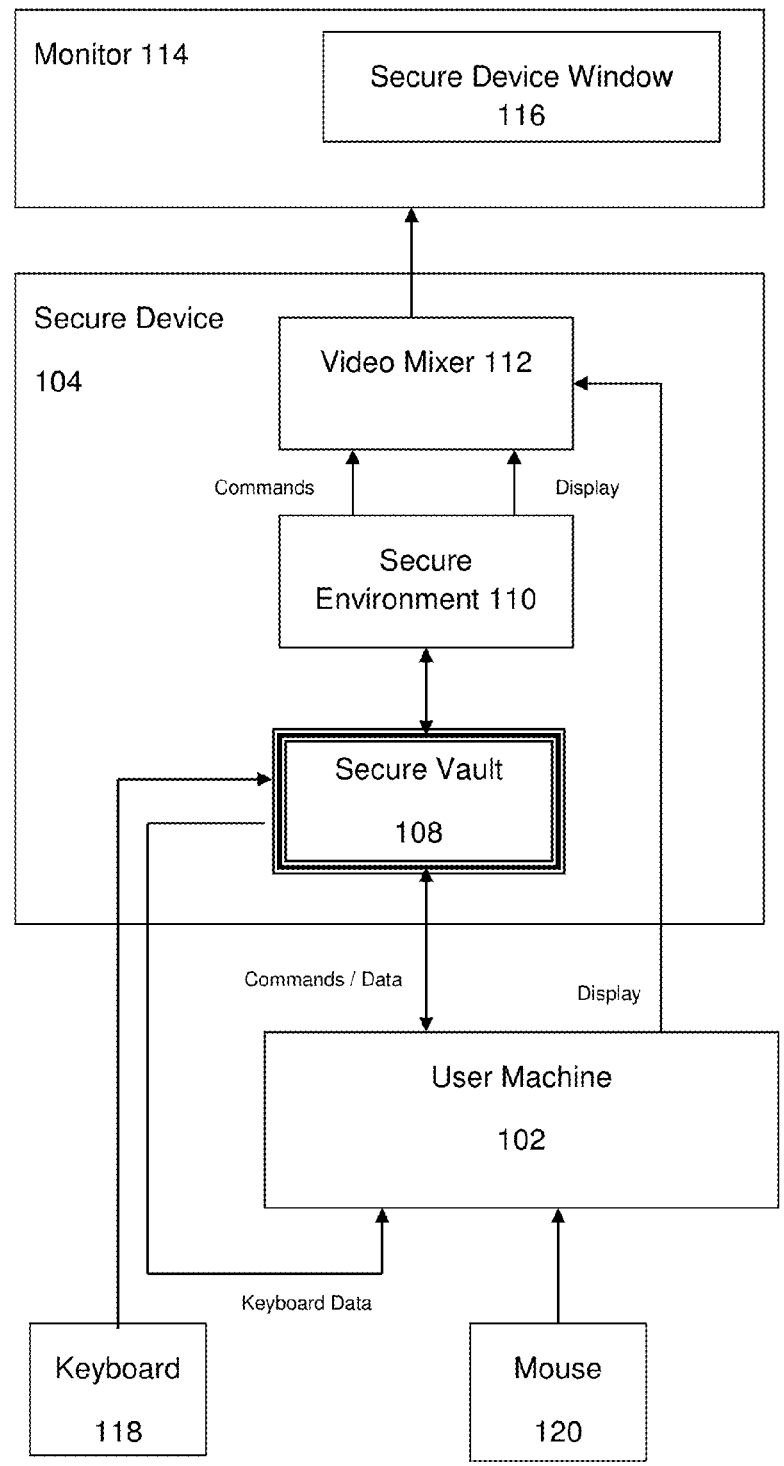
FIG. 1C is a block diagram illustration of a detailed secure device connected to a user machine, in accordance with an embodiment of the present invention.

Reference is now made to FIG. 1C, which is a block diagram illustration of a detailed secure device connected to a user machine, in accordance with an embodiment of the present invention comprising further to FIG. 1A and FIG. 1B the secure device 104 in detail along with arrows between different units outside secure device 104 and units within secure device 104 to indicate connections between these units to transfer data.

Secure device 104 contains a secure vault 108, a secure environment 110 and a video mixer 112.

User machine 102 connects to a secure vault 108. The secure vault is connected to the secure environment 110. Both the user machine 102 display and the secure environment display interfaces connect to video mixer 112 which outputs its display to the monitor 114.

Keyboard 118 is connected to the secure vault 108 which sends non secure keyboard typing to the user machine 102 through a connection between the secure vault and the user machine. In the present embodiment the keyboard is connected to secure vault 108 and keyboard data is transferred to the secure environment 110 from the secure vault 108. In some embodiments the keyboard may connect directly to the secure environment.

Mouse 120 is connected to the user machine 102 directly and mouse events are sent if needed through the connection of the user machine 102 and the secure vault 108. In some embodiments the mouse may connect to secure device 104 similarly to the keyboard connection where some mouse events may be sent back to the user machine.

The video mixer 112 receives commands from the secure environment 110 regarding where to place the window of the secure environment display 116. In this embodiment the secure device window 116 is placed in PIP in monitor 114, where PIP stands for picture in picture, a mode of displaying a window from a separate video input.

The user works normally on their machine 102 while secure data is handled only in the secure device 104. In a preferred embodiment, the user executes a secure program in the user machine and a window opens for the secure application on the user machine. The secure device is sent a request to execute the secure application and the PIP from the secure device appears in the window location intended for the secure application to display in the user machine. The windows coinciding in the same location on the display allow the impression of a single environment and the seamless secure environment use from the user perspective. In the case where a window frame belonging to the windowing system of the user machine exists, for example just on top or on all sides of the window, the PIP of the secure device is preferably displayed within the window frame of the user machine windowing system.

In some embodiments, the video mixer displays the PIP location according to commands received from the user machine. The used machine sends commands as well as location information and mouse movements to the secure device. The secure device moves its mouse pointer accordingly and sends PIP locations to the video mixer so that the user views a single environment and in regards to window location on the screen and mouse movements, it is for the user as if the secure device does not exist and there is only the user machine.

The secure device 104 forms an isolated environment with a gatekeeper that keeps non secure unauthenticated data out. Display and keyboard typing do not pass through the user machine when secure data is handled in the secure device.

If we look closer at the role of each unit, the secure vault 108 connects with the user machine to communicate encrypted, authenticated data files with the world outside the secure device 104 where these file are decrypted by the secure vault 108 and sent to the secure environment for processing. When data to be stored outside the secure device the files are encrypted by the secure vault and sent outside in encrypted form. In addition, the secure vault receives commands from the user machine such as initiation, location and focus of secure data usage. The secure vault forms a gatekeeper to the secure device.

The secure environment 110 receives unencrypted secure data from the secure vault as well as commands from the user machine through the secure vault. The secure data can be edited, viewed or created in the secure environment. The commands from user machine 102 include the location and size of the displayed secure data as secure device window 116 in monitor 114. The secure environment extends the secure vault in the sense that since no other data connection is available to the secure environment then only files that passed through the secure vault 108 reach the secure environment. The secure environment is also initialized through the secure vault.

The video mixer 112 receives display information from the user machine 102 and from the secure environment 110. The secure data from the secure environment is displayed in PIP on top of the user machine display. The video mixer receives commands from the secure environment for controlling the location and size of the PIP displaying secure data. The PIP location and size is set by the user similarly to using any other window in the user machine 102.

The monitor 114 displays the user machine display and the secure environment display in PIP. Together they seem as though all the computations occur on the user machine.

In the preferred embodiment the secure environment operates in a clean-room "sterile" conditions that only allows interaction from the outside world through files authorized by the secure vault or new files created within the secure environment.

The secure environment extends the secure vault by booting to an image authenticated by the secure vault and by having a communication channel only with the secure vault. The secure vault can also physically reset the secure environment to make sure it is under the control of the authorized image originating from the secure vault.

In the preferred embodiment, the files that are allowed by the secure vault are only files that have been created within a secure environment. Since the secure environment is initiated clean of infections and is cut off from the world in a cyber manner, it will remain clean onwards. That is the unique feature of a "parallel world" where data in one world does not cross to the other world.

Since keyboard typing and display information of secure data handling do not pass through the user machine, it is possible to keep data away from the reach of user machine 102.

The operation the secure device is as follows: Secure vault unit 108 passes secure files and commands between the user machine 102 and the secure environment 110. Secure environment 110 receives open, usable files, keyboard typing and commands and displays the processing output to its display interface. The secure environment 110 forms a secure extension to the secure vault 108. Video mixer 112 receives both the user machine display and the secure environment display. The video mixer 112 receives commands from the secure environment 110 and outputs to the monitor the expected output in term of the user, for both user machine 102 and secure environment 110.

Files that carry sensitive data are always encrypted outside the secure device. Each encrypted file includes a certificate for each of its authorized users so that only those authorized users can make use of the encrypted file within their respective secure devices only. Encryption and decryption as well as authorization of a file such as by hashing, takes place by the secure vault which encrypts and hashes all files leaving the secure device and decrypts and authenticates files going into the secure environment. The secure vault is able to decrypt data files with certificates allowing the specific secure device to open that file.

User machine 102 is connected to secure device 104. The connection to components within secure device 104 includes a two way connection to the secure vault 108 to transfer commands and various data, and a connection to the video mixer 112 containing display data from the user machine.

The secure environment 110 within the secure device 104 is an isolated execution environment with display data connected to video mixer 112 along with a connection for sending commands to the video mixer to control display of the video mixer 112. The secure environment is connected only through secure vault 108 for receiving commands from the user as well as possible data to be used only within the secure environment.

Both user machine 102 and the secure environment 110 display interfaces connect to video mixer 112 which outputs its display to monitor 114.

The secure environment 110 outputs its display in PIP (Picture In Picture) as secure device window 116 in monitor 114. The display of secure environment 110 does not pass through user machine 102. This way malware on the user machine cannot access the display information of sensitive secure data.

The Keyboard 118 may be connected in some embodiments to the secure environments and from the secure environment there is a keyboard data connection that connects to the user machine. When the secure device 104 is handling secure data, the keyboard is cut off from the user machine by the secure device. This way, key loggers for example on user machine 102 will not be able to intercept keyboard strokes of secure data handling.

In the preferred embodiment, the user machine 102 runs a dedicated control program whenever the secure device 104 is used. The dedicated control program opens a window in the user machine and transmits relevant control data of that window to the secure vault 108 within the secure device 104, including such requests as initiating a secure session, and sending mouse events such as location and display size and focus events.

The Mouse 120 is connected to the user machine. Commands relating to the secure device are transferred through the secure vault 108 to the secure device using the dedicated control program on the user machine.

In the present embodiment, all files carrying secure data are kept on the user machine in encrypted form using the secure vault 108 encryption key. The secure vault 108 transfers encrypted files from the user machine into open files in the secure environment 110 on which processing can be done.

Each secure file includes a certificate corresponding to each user allowed access to the secure file. The secure vault will only be able to make use of a secure file if the user secure vault has permission to use that secure file. Therefore a wrong email address or extra recipients, as well as system administrators and other privileged users and also hackers will not be able to access such files.

In some embodiments, data files that can be made of use with the secure environment are either: a) data files that have been created within a secure environment of some user. b) "Cleansed" files that have been transformed to be of use within the secure environment, as will discuss this later.

In the present embodiment when a secure data file is handled in the secure device 104, display information and keyboard typing do not pass through user machine 102. This means that even if the user machine is infected of hacked, the data handled through the user machine within the secure device is not exposed to attacks such as key logging, screen captures. Key logging is not possible because keyboard data is not transmitted from the secure vault to user machine 102 when secure data is handled in secure device 104. Screen captures cannot be taken because the display does not run through the user machine. Secure data cannot be accessed since it is being handled in a separate unit than the user machine.

This way of operation protects secure data from access of user machine yet lets the user access the data normally like any other window. This is achieved in the present embodiment by using a PIP mode in the video mixer 112 and controlling the PIP window location and size on the monitor 114 through the user machine.

In some embodiments the secure device can be a single unit such as a chip, a single device or included within the user machine. The term secure device, is used for explanation purposes and can be a physical entity as a stand alone device as well as an entity implemented within another device.

FIGS. 1A, 1B and 1C shows how secure data can be handled securely within a secure device through the control of a non secure user machine. The secure device handles secure data separately from the non-secure user machine; The non-secure user machine sends the secure device commands for using of the secure data within the secure device; The display is displaying the user machine and the output of the secure device while the secure device output is not passing through the user machine for protecting the secure data handling and prevent screen snapshots for example by the non secure user machine which may be hacked. Therefore the user machine commands the use of secure data without the secure data and its output being passed through the user machine keeping the secure data separate from the user machine. This is similarly taking place with the keyboard so that keyboard input goes directly into the secure device and upon secure data handling the keyboard does not pass through the user machine to protect secure data typing.

The way secure data can be used through the use of a non-secure user machine according to the system is shown in FIGS. 1A, 1B and 1C is as follows: The user requests to use secure data through the user machine. For example executing a program on the user machine that sends a command and a secure filename for use in the secure device. The secure data is then used within the secure device as commanded by the user through the user machine where the display of the secure data that is handled in the secure device is sent directly to the display for the user to view, without the secure output display data going through said user machine. This way screenshots of secure data and other monitoring cannot take place through the non-secure user machine.

The presented FIGS. 1A, 1B and 1C show how a secure environment with a user machine can be combined together for a seamless user machine experience for handling secure content while the secure contents remains protected within the secure device and is not exposed to the non secure user machine.

Figure 2:
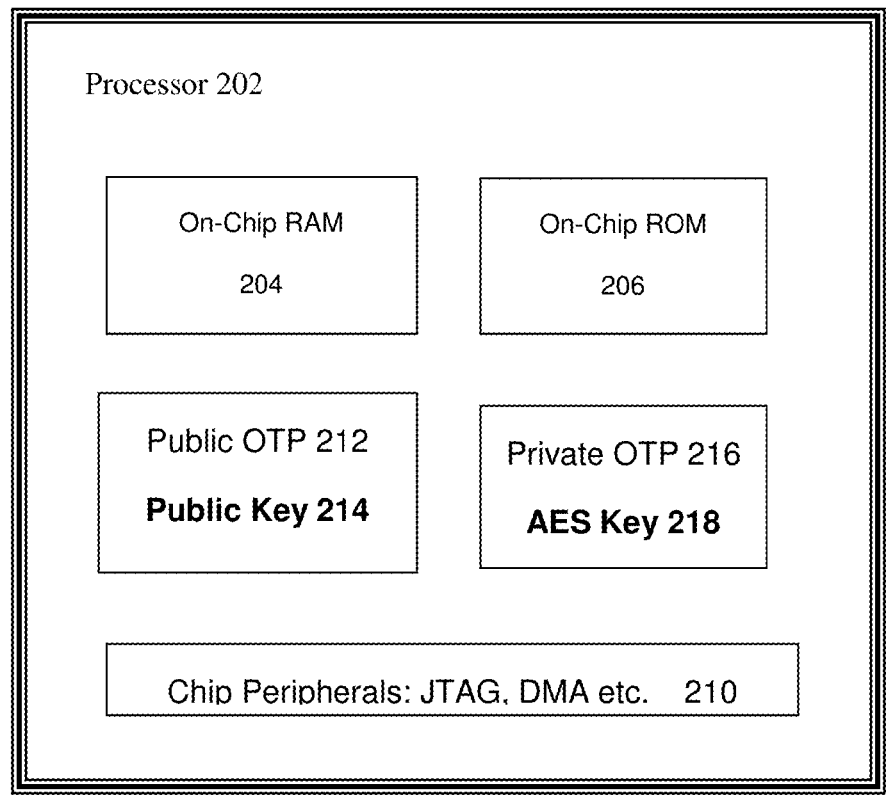
FIG. 2 is a block diagram illustration of a data protection processor, in accordance with an embodiment of the present invention.

Reference is now made to FIG. 2, which is a block diagram illustration of a data protection processor, in accordance with an embodiment of the present invention comprising processor 202 which a hardware secure unit comprising on-chip RAM 204, on-chip ROM 206, public OTP 212, private OTP 216 and chip peripherals 210 which include JTAG, DMA etc. OTP means One Time Programmable memory, that once programmed cannot be erased, for example, initial memory is all zeros and once a 1 is programmed it can no longer be returned to zero. The public OTP 212 is accessible all the time and within this memory at a specific location, a public key 214 is programmed by the user in a manner that cannot be later altered. The private OTP 216 is accessible only during a special secure mode of operation and within this memory AES key 218 is programmed.

The data protection processor of the secure vault 108 in secure device 104 preferably includes a hardware secure technology environment such as Lockbox from Analog Devices. Such a secure environment allows the prevention of pausing of execution, examining or altering the execution environment.

The ADI Lockbox technology authenticates signed code segments within on-chip RAM 204. Code in on-chip ROM 206 authorizes the code using the public key 214 programmed into public OTP 212 which is expected at a specific location as programmed in the on-chip ROM 206. This authentication process may take place securely on the chip.

When the code segment is authorized, the Blackfin chip goes into a special secure mode where it can: 1. Control chip interfaces in the chip peripherals 210 and can turn off JTAG, DMA, etc 2. Access private OTP 218. For example in the special secure mode when the code is authenticated, the chip can turn off peripherals and access the AES Key 218.

Following this process we have authenticated code running in a computing "island" protected from the outside world while having access to private OTP data 216 such as the AES secret key 218.

The signed code that is authorized in the authentication process is signed with a private key that corresponds to the public key 214. The private key must be kept protected separately from the chip. The private key may be generated and secured in protected manner using a hardware secure device similar to the present processor 202.

A device will be referred to as prepared for secure operations under the example of Lockbox when the following are in place: 1. A public key 214 is programmed into public OTP memory 212 in a specified public key location as expected by the on-chip ROM. 2. An AES key 218 is programmed into private OTP memory 216.

The secure vault 108 preferably includes processor 202 for implementing its security. The processor 202 includes an encryption key—AES key 218 that does not exist outside the secure vault in the current embodiment and which is only usable when the processor is in secure mode. Secure mode can only be achieved by executing a program signed with the private key that corresponds to the public key 214 programmed in the processor public OTP.

Therefore data that is encrypted using the secure vault 108 using encryption key 218 can only be decrypted by the secure vault 108 when the processor executes signed authenticated code.

Since secure mode means the secure environment is isolated and running authenticated code, secure data can then be handled securely and only in a secure mode of operation.

The secure vault 108 can autonomously do the following securely: a) Encrypt files using its AES key without revealing the key outside the vault. b) Decrypt files using its AES key without revealing the key outside the vault. c) Authenticate that a file has permissions to be used with the present secure vault. d) Authenticate permission of a file to be used with another secure vault belonging to another user. The encryption and decryption stages in the current embodiment include verification of the contents of the file using a hash function as well.

The secure vault with its AES key 218 is independently protecting files between data leaving the secure device 104 and entering secure device 104. Data leaving the secure device is encrypted by the AES key and data entering is decrypted using the AES key. The AES key in this embodiment only resides in the secure vault and the secure vault acts as a separator between the user world and the parallel world so that no data from either world finds itself in the other world. This separation is a key feature of this disclosure. In some embodiments non-volatile storage located within said secure vault can also be used in a similar way so that files located on the non volatile storage are in encrypted form.

The secure vault is used for saving, storing, retrieving and sending to another user, a file that has been created by the secure environment 110.

Once a file is retrieved, it can be used by the secure environment and again be stored and sent to another user.

Having these features, the secure vault can keep secure files encrypted outside the secure device and allow viewing and modification of secure files only within the secure environment 110 for an authorized user.

Furthermore, the secure vault can let a user share secure data with another user that is using another secure device.

In some embodiments the secure vault is handling secure files and is not accessible for any other task by any other entity. In some embodiments commands can be also transferred through the secure vault.

Following the secure vault 108 going into secure mode, the secure environment 110 boots up to an image file authenticated by the secure vault. This way the secure environment forms an extension to the secure vault and allows the creating, viewing and editing of sensitive data. The secure environment 110 connects to the outside world through the secure vault only. The secure vault may be viewed as a gate keeper for the secure environment but different to a firewall, it does not have any rule for allowing any data from the outside that was not originated from a secure vault.

There is one issue though, that must be resolved when using the secure device 104. What if a malware imitates the secure device so that the secure device never actually goes into secure mode, leaving the user unprotected?

In this scenario existing protected data cannot be viewed because the secure vault is not active and therefore will not decrypt existing protected data. Still, new data can be created by the misled user in an unprotected environment.

To solve this hole in security we use something similar to the totem used in the film "inception", in order to tell between the real world and the dream world.

In the film "inception" a totem is used to protect against the implanting of dreams. Only the owner of the totem knows how that totem feels in the real world, so that if someone plants a dream in that persons head the implanter will not know how the totem feels like and the dream world would be revealed by the totem owner.

In the current disclosure, we have the user recognize an image containing something only the user knows. That image is kept encrypted and is decrypted by the secure vault into the secure environment only in secure conditions. The totem image is displayed to the user prior to opening each secure data item by the user. The user should not let an adversary see the image much like the totem is not given to someone else to touch.

To solve our security hole then, if the user does not see the recognized image just prior to the opening of the newly created document then the user will know the environment is not safe and will not use it. Similarly secure content is presented with the totem image for the user for the authentication of the secure environment and the authentication of the secure contents to the user. The following FIG. 3A through 3C describe this process in the present disclosure.

Figure 3A:
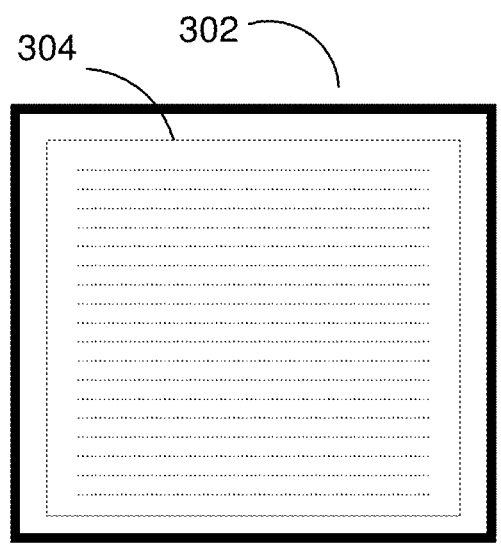
FIG. 3A is a block diagram illustration of a display with a non secure application displayed, in accordance with an embodiment of the present invention.

Reference is now made to FIG. 3A, which is a block diagram illustration of a display with a non secure application displayed, in accordance with an embodiment of the present invention comprising display 302 and a window displaying a non secure application 304. In this illustration a malware may alter data in the application and the user has little if no information about the authenticity of any of the application, weather it is being logged by a remote user, has it been altered etc.

Figure 3B:
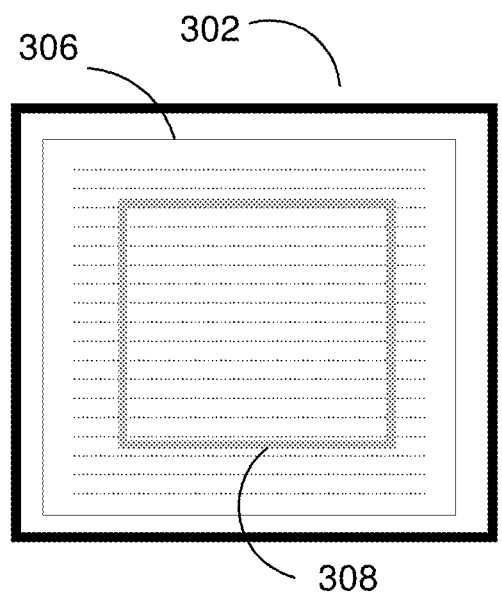
FIG. 3B is a block diagram illustration of a display with an authenticated secure application displayed, in accordance with an embodiment of the present invention.

Reference is now made to FIG. 3B, which is a block diagram illustration of a display with an authenticated secure application displayed, in accordance with an embodiment of the present invention comprising display 302, a window displaying a secure application 306 and an authenticating totem image 308 displayed in the background of the displayed secure application 306. The authenticating image is an image chosen only by the user and is part of the initialization of the security of the secure device 104. The totem image is kept in encrypted form capable of being opened by the secure vault 108 using the secret AES key 218 available to the secure processor in secure mode of operation. When the totem image is displayed to the user with an application, the application authenticates itself to the user, proving to the user that indeed the secure vault is operational in secure mode because otherwise the authenticating image would not be displayed. Since the display of the authenticated totem image as well as the secure application do not pass through the user machine, these cannot be accessed from a compromised user machine even while secure application is authenticating and executing. This way the secure device authenticates itself to the user.

Figure 3C:
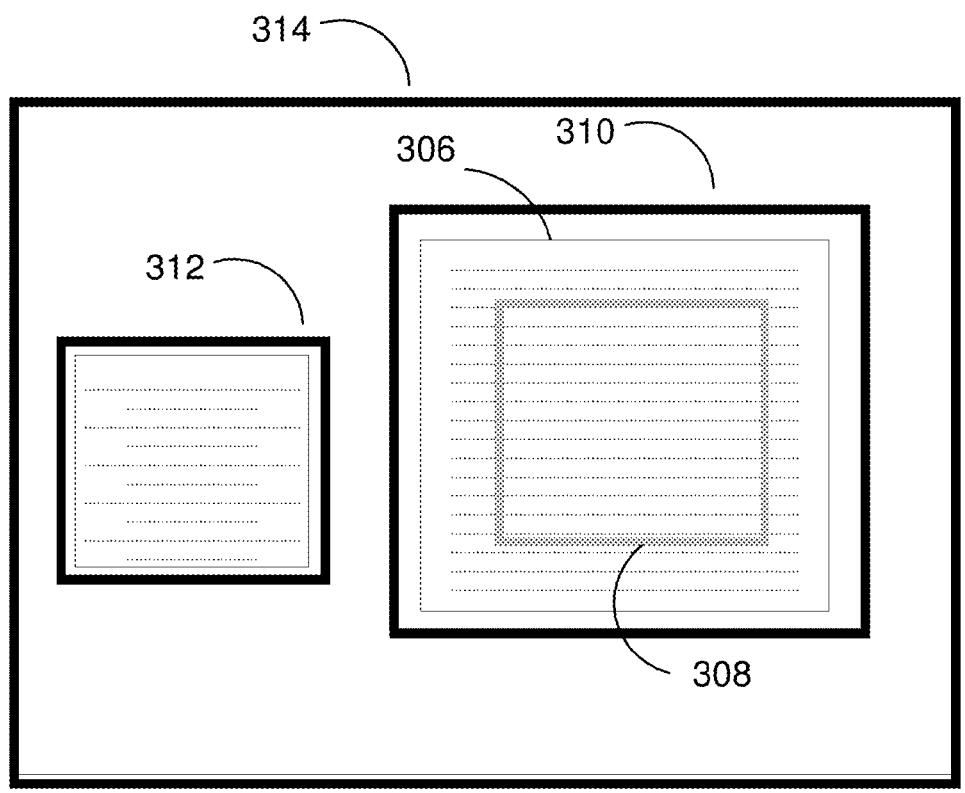
FIG. 3C is a block diagram illustration of a display with a non secure application displayed together with an authenticated secure application, in accordance with an embodiment of the present invention.

Reference is now made to FIG. 3C, which is a block diagram illustration of a display with a non secure application displayed together with an authenticated secure application, in accordance with an embodiment of the present invention comprising display 314, a window displaying a non secure application 312, a window 310 displaying a secure application 306 and an authenticating totem image 308 displayed in the background of displayed secure application 306. The description of FIGS. 3A and 3B regarding secure and non secure applications is similar to this FIG. 3C while here these secure and non secure applications reside together on the same display 314. This is done in this embodiment by using the video mixer 112 in PIP mode. This way the user machine controls the executing applications while the secure device protects the secure application from access of user machine so that even if the user machine security is compromised the secure application data will remain secure.

With FIG. 2, FIG. 3B and FIG. 3C it is possible to explain why the secure device 104 is safe from tampering. The authenticated image or totem image can be presented to the user only when the secure vault is in secure mode, because only then is the secret AES key available for decrypting the authenticating totem image. The secure vault can be in secure mode only if it runs an authenticated piece of code signed with the secret key that corresponds to the public key burned into the public OTP of the chip in FIG. 2. When the secure vault goes into secure mode, it resets the secure environment and loads it with a secure and authenticated image. The secure environment from the time of booting only received data through the secure vault that runs the authenticated program. Since the authenticated program only allows encrypted, authorized and authenticated files to pass into the secure environment, it is therefore that the secure device is effectively protected from tampering.

The protection offered by the secure device is fundamentally different from any other currently available protection mechanism, such as firewalls and traffic monitoring devices for example.

The secure vault is not acting as a firewall in the role of separating between the user world and the parallel, secure world. While a firewall allows some traffic to pass through and has rules to allow and deny certain actions for data that its origins and contents are unknown, the secure device completely blocks all traffic that has not originated from a secure device and that is not encrypted by a secure device. There are no rules in this sense and no unknown data of an unknown origin is allowed. Furthermore, there is no sharing of data between the user machine and the secure device, rather than command or mouse events for example.

Similarly, the secure vault is not acting as a traffic monitoring device, again because no unknown data or unknown origins passes through the secure device, while the secure device blocks all traffic that has not originated from a secure device and that is not encrypted by a secure device, with similar reasoning to the secure device being different to a firewall above.

From FIG. 3C it can be seen how a system can handle secure data and non-secure data together through a common interface, to be presented on the same display in this embodiment, while allowing the user to identify the secure handling of secure data. The user can identify the secure data handling with the totem image presented on the secure data handling window as shown in this figure. The display output of the secure device in this embodiment may be displayed directly to the user so that the secure data does not pass through non-secure devices.

From FIGS. 3B and 3C it can be seen how a secure system can authenticate secure handling of data to the user, namely a secure device is configured at least partially for handling secure data and in this embodiment this takes place following a controlled securing mechanism. The display is configured for displaying the secure device directly to the user so that secure display does not pass through non-secure devices such as the user machine. The totem image is displayed to the user and is recognized by the user where the data of the totem image is protected and available for secure access of said secure device. The user is presented the totem image through the display when secure data is processed in the secure device to authenticate the security of the secure device to the user.

Figure 4:
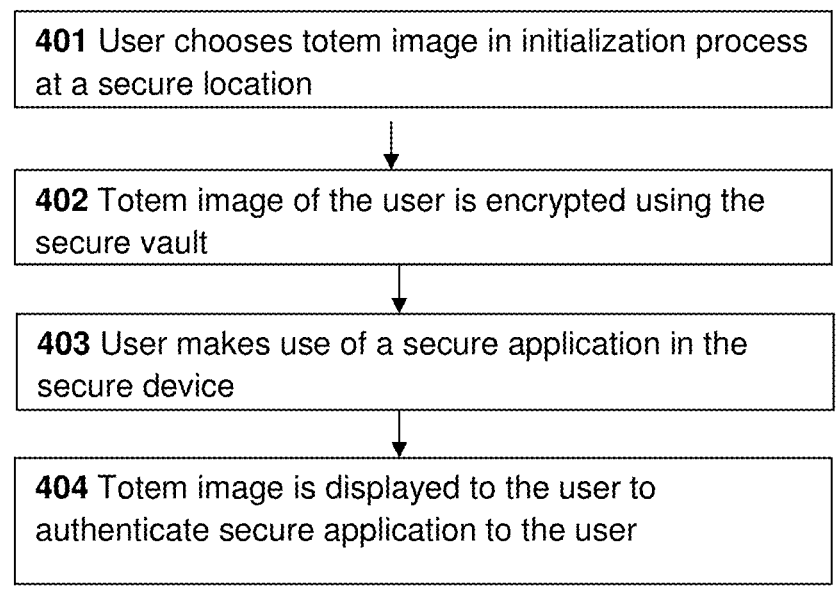
FIG. 4 is a schematic flowchart for steps carried out for using an authenticated image to authenticate secure applications, in accordance with an embodiment of the present invention.

Reference is now made to FIG. 4, which is a schematic flowchart for steps carried out for using an authenticated image to authenticate secure applications, in accordance with an embodiment of the present invention.

In step 401 user chooses totem image in initialization process of the secure device at a secure location. The totem image is an image the user personally chooses and no one else is aware of the image chosen by the user. The image choosing by the user is preferably made in a secure location preferably not connected to the network and in a computer environment that is preferably erased and initialized upon each user initialization process.

In step 402 totem image of the user is encrypted using the secure vault of the user. The secret key AES key 218 of the secure vault 108 is used to secure files for secure device 104 and is used to encrypt the totem image within the secure vault.

In step 403 user makes use of a secure application in the secure device. The user can create, edit, read and use a secure file in the secure device through the user machine.

In step 404 totem image is displayed to the user to authenticate secure application to the user. The secure device is also authenticated for being able to display the totem image that is protected by the secure vault. When the totem image is displayed to the user, the secure vault is in secure mode and the image has been decrypted in the secure vault and sent to the secure environment where secure data processing takes place. When the user sees the totem image the user can be confident the secure device is indeed the one used by the user and that the secure device protects user data from the user machine and from the outside world.

In some embodiment not only an image can be used as totem but any form of data the user can recognize, for example video or audio.

The secure device 104 protects the user data through the architecture of the secure vault 108 that separates the outside world from the secure environment 110. The secure environment 110 is an extension of the secure vault while the secure vault is the unit that runs the authenticated code to access the AES key 218 to access the totem image and display it to the user. The secure environment is loaded through a secure file image arriving through the secure vault. In order for the secure vault to make sure the secure environment is using the secure image through the secure vault, the secure vault can have hardware access such as hardware reset or cutting of power to make sure no program has been activated prior to secure vault initialization and remains active. In some embodiments the secure vault and the secure environment are implemented as a single unit.

From this fig. the authentication method that a secure system can carry out to authenticate its authenticity and security, as well as identity, is as follows: a totem is prepared for the user to be recognized by the user, for example, in an initialization of the device in a secure location not connected to the network. The totem is secured using the secure device so that the totem cannot be used outside the secure device, for example by encrypting and authenticating the totem with the AES keys of the secure vault. The user is then prompted for handling secure content by the secure device, using the secure vault, either for example to compose a new document, read or edit an existing document. The user is presented the totem image along with the secure contents, before it or at some other time, in order to authenticate the secure device security and integrity and prevent false imitation or mistaking the secure device to enter secure data in a non-secure environment.

These series of steps display how the secure device and how a secure application authenticates themselves to the user and how the authentication process is initially set up for the user.

Figure 5:
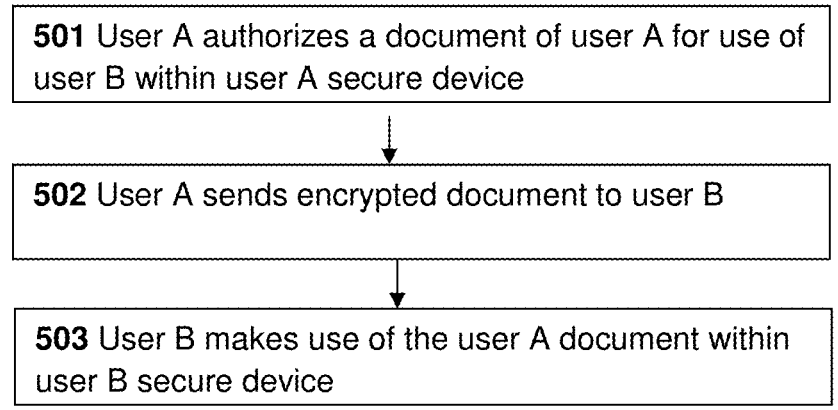
FIG. 5 is a schematic flowchart for steps carried out for sharing a secure document between two users, in accordance with an embodiment of the present invention.

Reference is now made to FIG. 5, which is a schematic flowchart for steps carried out for sharing a secure document between two users, in accordance with an embodiment of the present invention.

In step 501 user A authorizes a document of user A for use of user B within user A secure device. The authorization process takes place within the secure device 104. In order to make sure the user is indeed the one requesting the authorization for allowing user B to access the document, a random number is displayed to the user textually and the user is required to repeat it. This way the user authenticates to the secure device that user B is indeed the requested user to authorize for the document. There is no need for any complicated captchas here because the display is routed through the video mixer and does not pass through the user machine so a request to repeat a textual representation of a random number is sufficient for user authentication. As a result of the user authorization, the secure vault 108 creates a file intended for the use of user B. This may be a certificate only the secure vault of user B can use.

In order for secure data communication to take place between user A and user B there may proceed a step for initialization of secure data communication between user A and B. This initialization may be needed to take place once per any pair of users. Such a step may make use of SSL communication between the two secure devices. A new key may be generated or used with the secure vault for communication with each secure vault of each user independently. Other examples may be applicable in this case for securely sharing data between entities in a manner that each entity is authenticated. For authentication of a secure vault of a specific user, a server connected to the network may be applicable, so that secure vault of user A generates a file that the server can authorize and send secure vault of user B an authorization in this regard that only secure vault B can use and authenticate or otherwise that anyone can authorize. In another embodiment user A can generate a file that anyone with a public key belonging to user A can check and authenticate that indeed user A has created the document. There are various ways of authenticating and sharing keys between entities and this disclose can use each one with no limitation.

In step 502, user A sends encrypted document to user B. The document intended for user B cannot be made of use by any other user and other secure device. Therefore if the document is mistakenly sent to another user, the user will not be able to view the contents of the document.

In step 503, user B makes use of the user A document within user B secure device. User B may be limited in the use of the document for instance, read-only and not being able to send the document to another user, as well as not being able to copy and paste the document within the secure environment 110.

These series of steps display how a document can be shared between two users securely with sender authentication and implied limitations on the use of a received document. In some embodiment a document can be replaced with any data file or data communication.

Figure 6A:
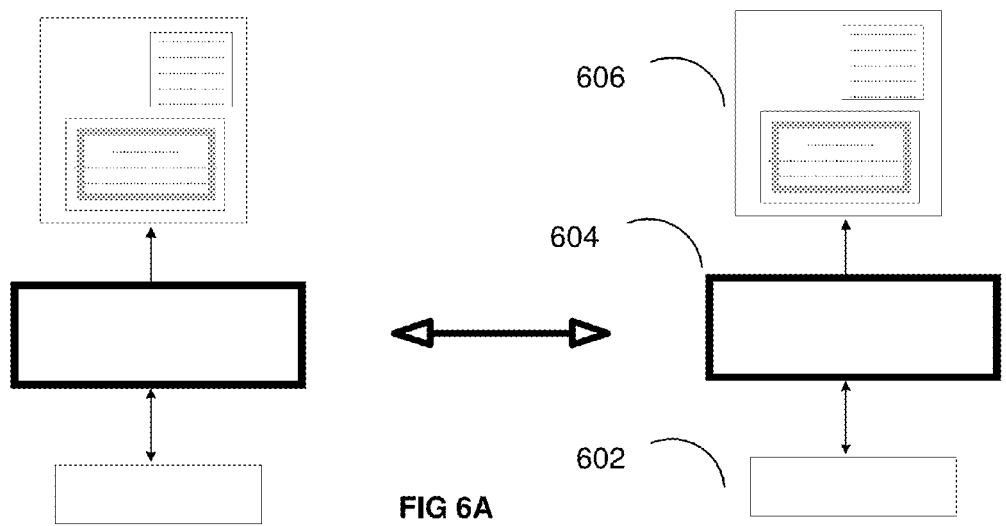
FIG. 6A is a block diagram illustration of sharing a secure document between two systems with a secure device, in accordance with an embodiment of the present invention.

Reference is now made to FIG. 6A, which is a block diagram illustration of sharing a secure document between two systems with a secure device, in accordance with an embodiment of the present invention comprising user A machine 602, user A secure device 604 and monitor 606 displaying both user machine and secure device displays together in PIP mode as described in FIG. 1A-FIG. 1C. The Fig. further comprising a similar system comprising a user machine, secure device and display for user B and a communication arrow between them to denote the means of communication which can be a direct connection or otherwise between the two environments. The sharing of a secure document between these users is explained in detail in FIG. 5.

Figure 6B:
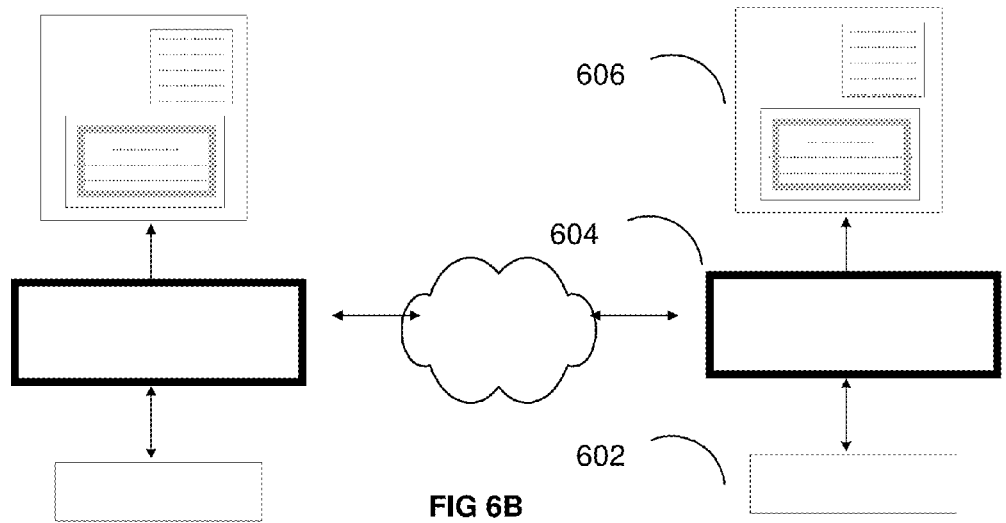
FIG. 6B is a block diagram illustration of sharing a secure document between two systems with a secure device that are connected through the network, in accordance with an embodiment of the present invention.

Reference is now made to FIG. 6B, which is a block diagram illustration of sharing a secure document between two systems with a secure device that are connected through the network, in accordance with an embodiment of the present invention comprising user A machine 602, user A secure device 604 and monitor 606 displaying both user machine and secure device displays together in PIP mode as described in FIG. 1A-FIG. 1C. The Fig. further comprising a similar system comprising a user machine, secure device and display for user B and a and a communication network between them denoted by a cloud denote the network communication between the two environments. The sharing of a secure document between these users is explained in detail in FIG. 5 while the communication takes place through the network passing the data securely, such as in encrypted manner.

Figure 6C:
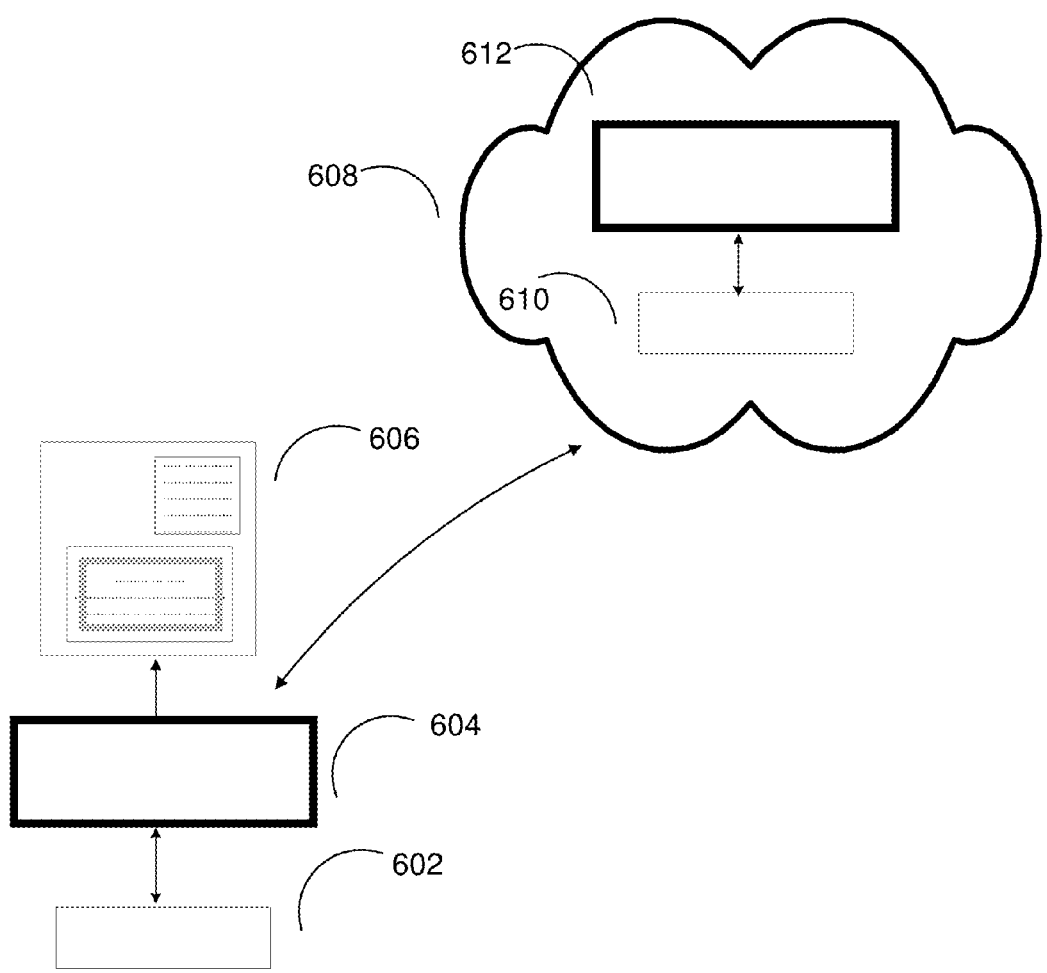
FIG. 6C is a block diagram illustration of using a secure application running on the cloud, in accordance with an embodiment of the present invention.

Reference is now made to FIG. 6C, which is a block diagram illustration of using a secure application running on the cloud, in accordance with an embodiment of the present invention comprising user A machine 602, user A secure device 604 and monitor 606 displaying both user machine and secure device displays together in PIP mode as described in FIG. 1A-FIG. 1C. The Fig. further comprising communication with a cloud 608 which in addition to storage comprises a cloud computing machine 610 connected to a cloud secure device 612. In addition to storing files for the user, the cloud can make use of user secure files and securely communicate results of the processing of the secure user data. In this manner cloud computing can be made to be secure. Uses can range from email services, multimedia services, document writing and sharing services, calendar services etc. The initial set up with the cloud may take place as explained in FIG. 5, and from that point the cloud can serve the user securely.

Figure 7A:
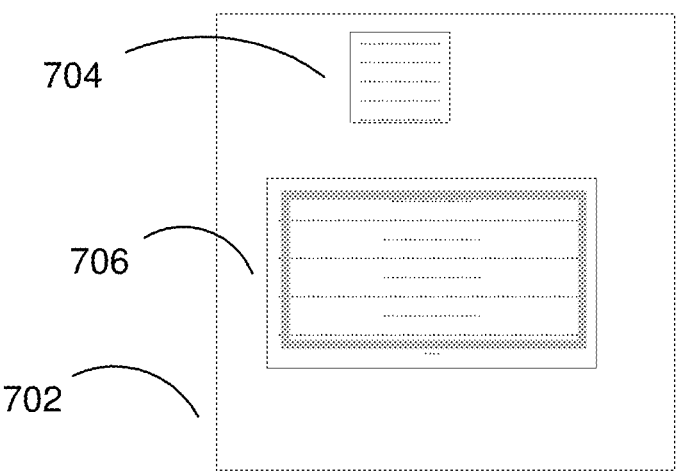
FIG. 7A is a block diagram illustration of a display with a non secure application displayed together with an authenticated secure application, in accordance with an embodiment of the present invention.

Reference is now made to FIG. 7A, which is a block diagram illustration of a display with a non secure application displayed together with an authenticated secure application, in accordance with an embodiment of the present invention comprising display 702 displaying a non secure window 704 of a non secure application and a secure window of a secure application 706 that is authenticated to the user using a totem image.

Figure 7B:
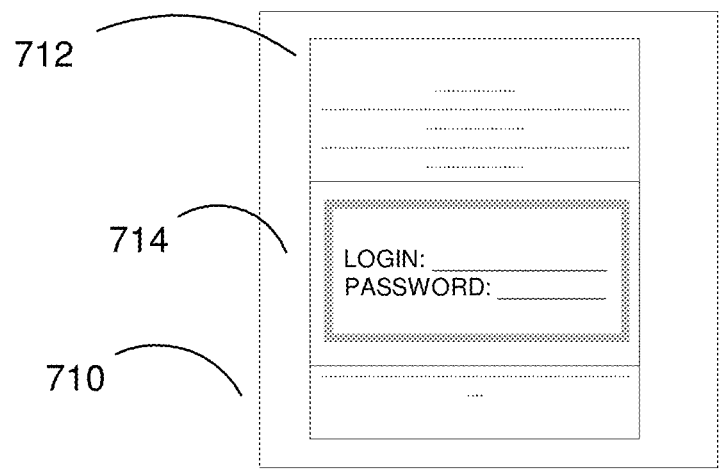
FIG. 7B is a block diagram illustration of a display with a non secure web application part displayed together with an authenticated secure user login application part, in accordance with an embodiment of the present invention.

Reference is now made to FIG. 7B, which is a block diagram illustration of a display with a non secure web application part displayed together with an authenticated secure user login application part, in accordance with an embodiment of the present invention comprising display 710 displaying a non secure web application part 712 displayed together with an authenticated secure login application web application part 714 where the secure login part is authenticated to the user using a totem image. The data we wish to secure which is the login and password pair here, is handled securely and is then transmitted preferably to a remote server that communicates with the user secure device such as explained in FIG. 7B. This way data that is sensitive cannot be captured such as by key logging and other means available when secure data is used on a non-secure user machine for example.

Figure 7C:
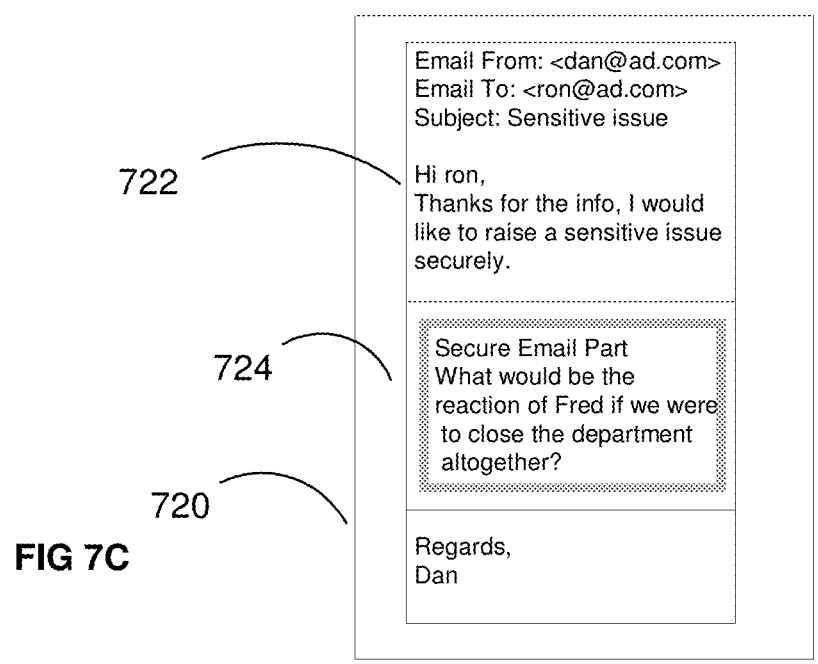
FIG. 7C is a block diagram illustration of a display with a non secure email application part displayed together with an authenticated secure email application part, in accordance with an embodiment of the present invention.

Reference is now made to FIG. 7C, which is a block diagram illustration of a display with a non secure email application part displayed together with an authenticated secure email application part, in accordance with an embodiment of the present invention comprising display 720 displaying a non secure email application part 722 displayed together with an authenticated secure email application part 724 where the secure email application part is authenticated to the user using a totem image. The data we wish to secure which is the secure email part, is handled securely and is received and/or then transmitted preferably to a remote server that communicates with the secure device of the user, such as explained in FIG. 7B. This way data that is sensitive within an application such as an email application cannot be captured such as by key logging, screen captures, network tracing and other means available when secure data is used on a non-secure user machine for example.

Figure 8:
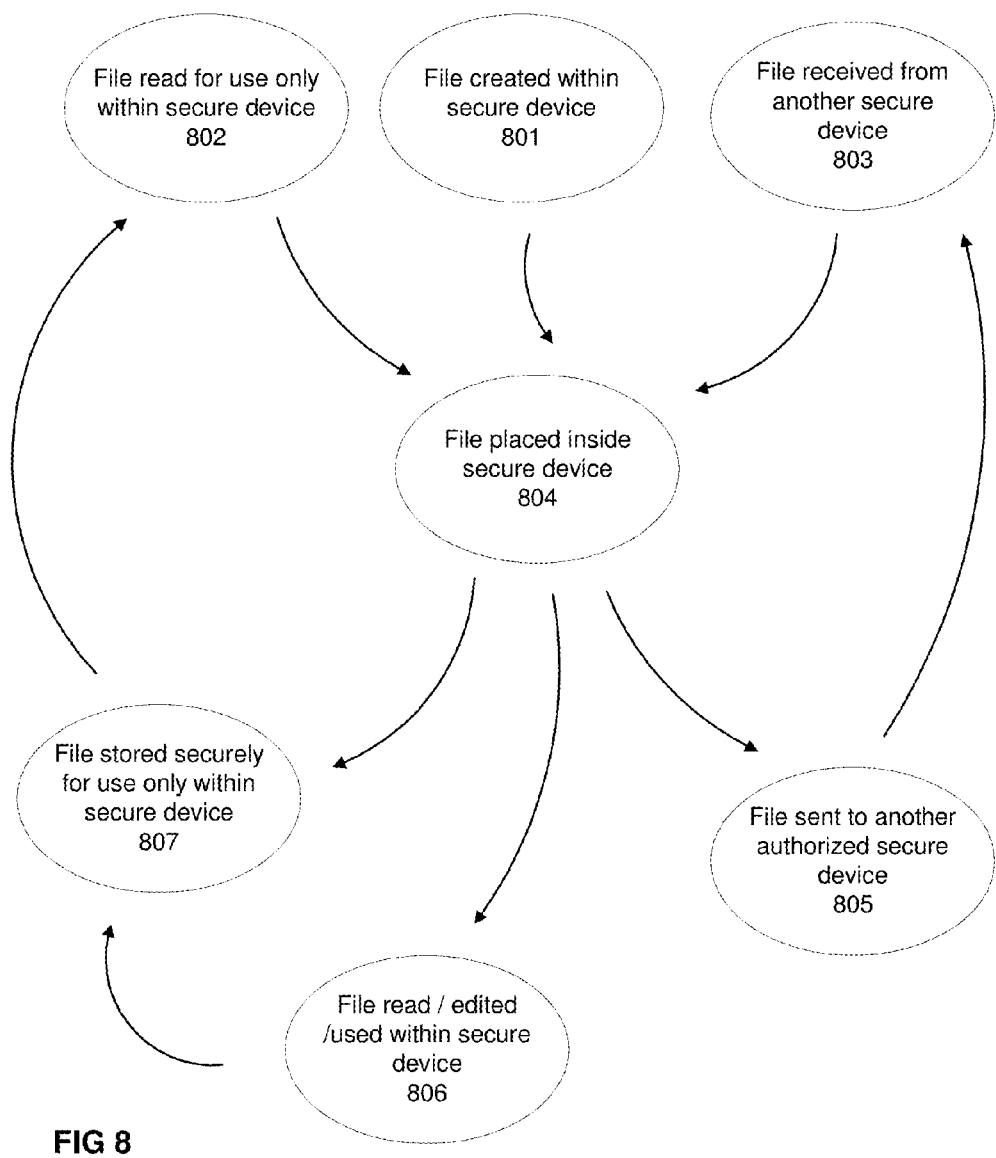
FIG. 8 is a schematic flowchart of the lifecycle of a secure file for use with a secure device, in accordance with an embodiment of the present invention.

Reference is now made to FIG. 8, which is a schematic flowchart of the lifecycle of a secure file for use with a secure device, in accordance with an embodiment of the present invention.

In step 801 file is created within the secure device. The creation of the secure file is made for example using a secure application. For example, a user opens a secure document editor and creates a new document. In the preferred embodiment, the user initiates a secure application which causes an initiation of the secure application in the secure device. The video mixer then presents the secure application in PIP with the user machine display where the PIP from the secure device appears in the window intended for the application on the user machine. The windows coinciding in the same location on the display allow the impression of a single environment from the user perspective. This step is followed by step 804.

In step 802 file is read for use only within secure device. A file for use only within the secure device is preferably a secure file encrypted with the secure vault AES key and is kept secure if placed outside of said secure device. In some embodiments at least some of the storage of the secure device resides outside the secure device in a secure manner. For example, data files may be located in encrypted form on the user PC. When a secure file is requested by the user, such as by the user executing a secure application on a secure file, the file is first decrypted in the secure vault and sent to the secure environment for processing. This step is followed by step 804.

In step 803 a file is received from another secure device. The file may originate from another user or from another source, for example a file from the cloud or a displayable html or image from a remote server with a secure device that has been initialized to communicate secure data with the secure device of the user. The file as in step 802 is preferably a secure file encrypted with the secure vault key. When the secure file is received by the secure device, the file may be first decrypted in the secure vault and sent to the secure environment for processing. This step is followed by step 804.

In step 804 the file of the data the user created, modified, read, received etc is placed inside the secure device. The file is located in a location accessible to the secure environment where it can be used. In one embodiment the file is kept in a RAM disk of the secure environment to enhance security. This step can be followed by steps 805, 806 or 807, depending on the user command.

In step 805 file is sent to another authorized secure device. The details for this step can be seen for example in FIGS. 6A, 6B and 6C. This step is followed by step 803 in the other authorized secure device.

In step 806 file is read, edited or used or any combination of these, within the secure device. File is used by the secure device within the secure environment. This step is followed by step 807.

In step 807 file is stored securely for use only within secure device. The file is sent to the secure vault where it is protected for example, encrypted with the AES key of the secure vault. The file then can be stored locally in the secure device, or dent outside the secure device to be stored for example in the user machine. This step is followed by step 802.

Please note that deleting a file may take place even without the secure device, such as if the secure file is kept on the user machine, it may be deleted directly without being first sent into the secure device.

These series of steps display the lifecycle of a secure file for use with a secure device from creation throughout its usage. In all stages the file is never available in open, readable form outside the secure device and is available only within a secure device where it can be viewed, edited and used. The file is always separate from the user machine which cannot access the file for its contents even while the file is used. In the preferred embodiment the secure file is signed prior to being encrypted so that if a file is altered outside the secure device the file will not be valid.

Additional aspects and detail of the preferred embodiment now follow.

The secure environment is a clean sterile environment for working with secure data. It is initialized by the secure vault and connected to the outside world only through the secure vault, which sends it files that are authorized for use.

The secure environment display runs directly to the monitor through the video mixer and does not go through the user machine.

The secure environment receives commands through the secure vault which may originate from the user machine or another external device. These commands include focus and un-focus commands as well as the requested usage of the received unencrypted files such as, execute a viewer or an editing program for the received file or filename.

The commands also include a size and location of display on the screen. This data is communicated to the video mixer which displays the document or application in its proper location in PIP on the monitor. If a window frame is present in the user machine then the PIP is preferably located within the window frame intended for the secure application in the display of the user machine.

The secure environment also receives the input keyboard as well as sends out the keyboard to the user machine. When keyboard typing is not intended for a secure environment it is transferred to the user machine. When the keyboard typing is intended for the secure environment, the typing is not sent to the user machine. This way it is not possible to log the keys typed from the user machine in secure conditions.

The secure environment receives mouse moves and clicks and sends them to the application executing in the secure environment. This can be done through commands received from the user machine.

The video mixer receives display inputs from the user machine and from the secure environment. The mixer also receives commands from the secure environment for where to locate the secure environment window and its size.

Using such a setup it is not possible to take a snapshot of the secure environment from the user machine such as by doing a print screen because the secure environment display does not run through the user machine.

Some monitors include PIP functionality built in so that can replace the video mixer in some embodiments.

In the present embodiment, the user machine has installed a secure device program for working with secure files which are encrypted and unusable on the user machine.

The secure device program executing on the user machine opens a window with empty contents which is where the PIP output of the secure device will be located. The video mixer mixes the user machine display output and the secure device display in PIP.

In a preferred embodiment, upon double clicking on a secure file in the user machine, the secure encrypted file is sent to the secure vault along with a command such as, open this file and display it. When the file is opened, keyboard typing is directed to the opened document in the secure environment and does not reach the user machine. The display of the secure data appears in PIP located in the window opened in the user machine display, as explained above. Mouse focus and movements are communicated through the secure device program on the user machine to the secure vault for implementing mouse clicks and moves within the secure environment and for displaying the correct window location and size in coordination with the user machine display.

The technical objectives of this disclosure are to create an isolated and secure environment for handling secure data while letting the user manipulate the secure data in a seamless manner that looks as if only the single machine of the user is being used.

The objective of the creation of the isolated and secure environment is met with the implementation of the secure vault and its extension, the secure environment which is isolated from the world with the exception of the secure vault.

The objective of letting the user handle secure data while keeping it secure is met with the prevention of secure data, display data and keyboard typing from reaching the user machine.

These objectives as described can be technically met in an embodiment using the equipment described below. Please note that the proposed hardware may be replaced to similar available items.

In some embodiment the secure vault is implemented using the BF548 Blackfin processor from Analog Devices that implements the Lockbox hardware securing technology along the lines described in FIG. 2.

Connections can be made in various ways between the secure vault and the user machine and between the secure vault and the secure environment. For example, USB and RS232 connections.

The secure vault enters secure mode and executes an authenticated program written for the system herein. A program can only be authorized for the secure vault with the secret key corresponding to the public key burned into public OTP. The secure vault executes the authenticated program and gains control to the secret AES key. The secure vault preferably remains in secure mode, receiving secure encrypted files, decrypts them with the AES key and passes the files to the secure environment for processing.

Encrypted files can only be used when the device is in secure mode, which can only be achieved when the executed software of the secure vault is authenticated by the secure vault. Only then can the AES key of the secure vault be accessed.

The secure environment is booted at the command of the secure vault, in some embodiment through a physical connection to reset and initiate booting. The secure environment is booted from an image file authenticated by the secure vault.

In this manner security is founded by the secure vault and extended to the secure environment. The secure environment extends the secure vault, communicates data only with the secure vault. In some embodiments the secure environment is implemented with a Pandaboard. In other embodiments the secure environment is implemented with a Raspberry Pi board.

The board of the secure environment may include connections such as USBs, USB OTG, serial RS232, HDMI and DVI and others. The board connects to the secure vault for booting and for transferring secure files. There is a dedicated connection from the secure vault to the secure environment to control power and/or reset to control initializing and loading of the secure environment.

The keyboard may be connected to one of the USB ports and the USB OTG may be used is used for transferring non secure keyboard typing to the user machine. The keyboard connections may be made in some embodiments to the secure vault. In other embodiments connections may be made to the secure environment, both or one to each environment.

The Video Mixer is connected to a RS232 port of the secure environment for controlling the location and size of the secure environment display in PIP mode.

The secure environment authenticated boot image may be built in such a way so that the peripherals of the secure environment are not effective for connections other than for the purposes listed above, so for example, the keyboard connection will not allow usage other than for entering keyboard typing.

In the preferred embodiment the secure environment runs a program that listens to the commands arriving from the secure vault, receive files arriving from the secure vault, and execute the required operations.

The secure environment receives keyboard and mouse moves, which are passed to the application processing the secure data file.

The video mixer operation is as follows: The displayed secure data originating from the secure environment is displayed in PIP directly into the monitor without being passed through the user machine to avoid screen snapshots for example.

There can be different ways to gain PIP functionality, such as monitors that have multiple video inputs and include PIP functionality built in with the ability to receive commands through some connection.

In this disclosure we use an external video mixer that is capable of being command driven through an RS232 connection. This is meant as an example and other ways exist.

In some embodiments the Ambery MPV-100 Dual-Channel VGA DVI PIP Video Mixer is used as video mixer. Additional other video mixers may be used.

In the present embodiment PIP is used through a video mixer but other methods of combining outputs of different computing environments may be available, such as virtual machines. Other ways of passing display of a secure device to the user without passing the display through non secure environments may exist. The intention of this disclosure is to provide one full example of the preferred embodiment and these details should not be limiting.

The user machine is connected to the secure vault, for example using a USB cable and the user machine keyboard is received from the secure environment. The display of the user machine is connected to the video mixer.

An application is executing on the user machine for activating the secure device. When the application is activated by the user, it opens a blank window on the screen and sends data to the secure vault that includes the requested program and file, as well as the size and location of the window that was opened by the application on the user machine.

In the preferred embodiment the secure data file resides encrypted on the user machine and is transferred to the secure vault where it is authenticated, decrypted and transferred to the secure environment where it is opened in an application and displayed in PIP mode directly on top of the blank window opened on the user machine.

The PIP window is placed inside the standard window manager frame which can be moved, resized, out of focus and in focus and so forth. Such commands are sent to the secure vault and passed to the secure environment to handle display and keyboard input correctly.

The type of data that can be used in the secure device ranges from images and documents, emails, code, etc.

Programs such as word processor, excel, notepad and image viewer are installed in the secure environment authenticated boot image file. This file is authenticated by the secure vault and can be updated with another authenticated image.

When a secure data file arrives, a program installed in the secure environment is executed to handle the file. This way documents, excel, notes, images and so forth, can be viewed and edited.

An email message can be protected by implementing for example using a plug-in to the existing email client on the user machine. The plug-in can pop up the secure environment PIP over some of the email text to add secure data to the email. When the email is sent, the secure data part of the email is secure even if some email users were wrongfully addressed. This is because the secure part can only be accessed by those intended to view the secure data part.

In a similar manner credentials can be entered into forms and into web pages. The implementation for entering credentials into a web page can be implemented by either having a secure device at the web server or by adding an SSL implementation within the secure environment for example.

Since the secure device is meant to be seamless for the user, it is important for the user to be able to differentiate a secure environment from a non-secure environment. In order to differentiate between the environments we use the "totem" image for having the secure device authenticate to the user that a window is a secure window. In the example of the credentials to be entered to the form above, when the user sees the totem image and then the user/pass prompt, or the totem image overlayed the user/pass prompt, the information can be typed safely from interception. Similarly this is the case for the secure email part, for secure documents etc.

Use case for showing the benefit of the secure device is now presented as follows:

User creates a secure data file within the secure device.

a. User clicks on the secure file application icon on his machine b. The secure device authenticates itself to the user by displaying the totem image c. The secure application is executed in the secure environment and displayed in PIP to the user d. The user edits the document. All key typing and display does not pass through the user machine e. The user saves the file. The file is encrypted and stored on the user machine Use case for authorized user opening an existing secure file for viewing or editing.

a. User clicks on the secure file application icon on his machine b. The encrypted file on the user machine is moved to the secure device and decrypted for use of the authorized user c. The secure environment authenticates itself to the user by displaying the totem image d. The secure application is executed in the secure environment displaying the decrypted secure file. The display is carried out in PIP to the user e. The user edits the file. All key typing and display do not pass through the user machine f. The user saves the file. The file is encrypted and stored on the user machine Authorizing additional users can be done for example by implementing SSL in the secure vault. In such a scenario key exchange may occur between two devices and one device may use the second device encryption key for encrypting a digital certificate that includes a decryption key for a secure file, for example. Furthermore, a different key may be created and used for the secure communication between two or more secure vaults. In some embodiments a certificate may be used for passing the same file to multiple users and only an encrypted certificate is created for each user. The certificate includes the secret key for opening the file.

Using this described technique for communicating secure data, a program is made for adding users that will be allowed to access a specific document. This program will execute in the secure environment. A textual, non graphical captcha in the form of textual random letters/digits will be displayed to authenticate the user consent to the authorization (in addition to the totem flashing before or while the program for adding users is executed). This ensures additional users are not added by a malware or by an attack on the user machine. The use of a simple non graphical captcha can be effectively used to authenticate that it is the user rather than some program that is attempting blinded authorization for accessing secure data. That is because the display data does not pass through the user machine.

The authorizing of additional users being able to access a secure file will work only for documents that are allowed accessed by the current user. In some embodiments the user may not be able to add users if that user does not have certain privileges. For example the creator of the secure file may send files to users but these users may not pass the file onwards. The owner of the secure file may allow others to become owners, allow read only permissions or allow editing as well. The owner may allow or disallow sharing of a secure file for non owners and so forth. This way each file may have a specification of privileges with different privileges for different users including read only, editing and sharing etc.

In some embodiments, in order to make use of existing documents and move them into the parallel world a cleansing process may be implemented. This process intends to remove any malware that may be embedded into the document. The process turns the document into images, transfers them into the secure device which may alter the images and move them to the secure environment. The secure environment may then reconstruct the document using OCR and with identified images within the document. The document may not be fully editable like the original but may be sufficient to preserve security and usefulness.

In some embodiment a web plug-in for entering user credentials securely may be included along with the existing communication to the web server. In this scenario a PIP window pops up with credentials input and other data that needs to be securely typed and received. The typed data is then passed to the server without the user machine being able to monitor data such as through keystrokes or display. In the preferred embodiment, the totem image described above is flashed to the user just prior or during the inserting of the credentials and other secure information.

The email plug-in for securely sending emails as described above uses a PIP window that pops up over email textual input and safely receives the data and then passes it to the server without the user machine ever exposed to this data. The data is then displayed to the receiver in a PIP window without the user machine being able to access the email message. In the preferred embodiment, the totem image described above is flashed to the user just prior or during the entering of the secure email message.

In some embodiments it may be a preferable to pass keyboard typing through the secure vault rather than the secure environment.

In some embodiments SSL is implemented in the secure environment so that applications may communicate with data that is securely available in the secure device, for example credentials that need to travel securely to a server over SSL.

In some embodiments VPN is implemented in the secure device so that applications may be executed in a more secure environment that is separate and inaccessible from the user machine.

In some embodiments networked applications may execute using the secure environment making use of the feature that the environment is separate from the user machine. For example, remote desktop may be used for controlling a computer at a remote site without worrying about interception, key logging, and display snapshots locally at the user machine.

In the remote desktop example, if VPN is used between the remote computer and the secure device then working using the secure device is secure from any local interception or malware.

This possibility of working remotely in an environment safe from interception opens up the capability of executing applications remotely without the risk of malware that can monitor the user. This is especially useful in banking websites, digital purchases through the network etc.

In some embodiments code can be protected while being edited and shared through the secure device. If the secure device includes a compiler then it is possible that only executable files can be formed, hence protecting the source code.

In some embodiments a secure device may be used in cars and other vehicles for securing critical data in the car computer. As vehicles become more computerized and more connected to the internet, so do the security risks grow and the importance of authenticated software and safe secure data usage becomes essential. Transferring data to and from the vehicle can become secure this way as well.

In some embodiments a secure device may be used to secure the internet of things. This means devices such as used for smart homes can connect securely to the internet to receive commands and transmit status. Once devices that control and monitor systems in the house can safely connect to the Internet, the use of such devices will become increasingly adapted.

It is important to note that the secure device cannot be simply change for the user because first off, the totem image will not show and secondly, existing files will not open because of the different AES key in the secure vault.

In some embodiments multiple secure environments can connect to a single secure vault for enhanced performance. Such an advantage can be, for example, more than one secure window displayed simultaneously for some embodiments.

The secure device has the additional advantage of offering authenticated recipients, authenticated sender as well as authenticated edits, writes and composer or composers. This unique feature that can authenticate members of a document is an important feature of this disclosure. If a remote server is used then the server can be authenticated as well. This is important for payment, banking etc. This can be implemented, for example, by using the secure vault which creates certificates fir each file passing by it to another user.

The secure device can securely remotely control a remote system where the GUI runs on the secure device and the commands are then sent, through XML secure files for example, to the remote server that also has a secure device.

In some embodiments the secure device is extended to mobile phones. For example, the microphone can run into the secure device and from the secure device to the phone itself. In this case the microphone can be cut off from the phone and the conversation or sound recording becomes secure. Similarly the speaker can connect to the secure device directly so that the secure device can output a secure conversation or sound recording to the user without the sound going through the phone itself. Similarly, a virtual keyboard can run into the secure device. The secure device can pop up a secure data window bypassing the phone as well.

In some embodiments, different levels of authority may be implemented, for example by rank or group, and with different types of permissions such as for certain secure files and actions allowed on those secure files. This can be implemented using different certificates for a file so that a user may have a certificate for opening a file for reading but not editing or sending onwards to another user.

In some embodiments groups of permissions may be in place for managing a large group of people that are allowed certain permissions to access secure files. For example, consider an intelligence army base with a large number of classified documents. A large number of people will have permission to view level A (lowest rank) classified documents. A smaller number of people will have permissions of group A+group B for having additional permissions to view additional files and so forth. In this manner it is easy to control permissions for each document and on a per user base, with the ability to block passing of document onwards or to save documents aside. So if a new document becomes available, its author then assigns it a permission group (group B). If a new user arrives, this user will receive group A permission group and will for example not be able to view the new document.

In the way described above regarding groups of permissions, groups of devices may be implemented in order to manage a large group of privileged users.

In some embodiments in order to protect the display output of the secure device, such as by installing a transmitter in the monitor or its cables, the secure device may be included with the monitor or cable connected to the monitor. Furthermore, in some embodiments the display and/or cable may be surrounded by material disabling transmission of display data.

In some embodiments the secure vault may be implemented as a virtual machine such as VMware.

In some embodiments, permissions for sending a secure file to another user may be restricted. For example, only the creator of a document or its owner may be able to send the file to another user. In some embodiments, permissions may be shared and transferred.

In some embodiments the totem image may be added along with a current detail such as the current date from a server or from the local user machine.

The solution described in this disclosure introduces a parallel world of security that isolates and protects data yet keeps it usable. The usability is seamless for the user that works as if all the work is done on her computer. The secure portions may authorize themselves to the user which may be the only difference noticeable to the user.

The solution presented in this disclosure can be used to protect the organization data even if an intrusion has already occurred, and protect the organization even from an inside data breach. That is because secure data is used separate from the computers that use them and that secure files are preferably encrypted only for use in secure devices. Since the secure vault runs an authenticated signed program that matches the public key burned into its OTP memory, the access to the secure key can only take place when the secure vault runs an authenticated program. Since the authenticated program hermetically separates between the outside world and secure environment, the secure data remains secure even from currently existing security breaches and people inside the organization that may intentionally or unintentionally send secure data outside the organization.

In the current situation of cyber threats, building a secure system is always a challenge, especially when a system is connected to the internet and may already include various malware installed. The challenges of securing data in a system that is connected to the internet or even a private network that may include malware are mitigated by creating a "parallel" execution environment that is unreachable from the user machine yet usable by the user.

The parallel execution environment is protected by the secure vault that has the role of ensuring security from boot time of the secure environment throughout its life time.

The I/O of the parallel world execution, namely key strokes and output display, does not pass through the user machine. The display of secure data to the user takes place in a PIP mode and all keyboard typing is passed only into the secure environment.

It is an object of this disclosure to remove all cyber attack surfaces from the access of the user machine when secure data is handled.

It is an object of this disclosure to allow the handling of secure data on a user machine that is compromised while keeping the secure data protected.

This disclosure protects the user data to the maximum by exactly allowing the authorized recipient to view, edit and share secure data while keeping the secure data separate from the access of the user machine. Two environments that work in parallel are formed where the user is the only point of connection between them, and the secure environment authorizes itself to the user using the totem image. In some embodiments more than two environments may be used and more than one of each environment may be used. The description of the two environments is made for the understanding and separation between them and the two environments should not be limiting.

Maximum breathing space is gained when data can be used by its authorized recipients and owners only and is secured from cyber attacks, interception and other unauthorized entities, even system administrators. For instance, mass copying of data is prevented by the system inherently.

The current disclosure may use off the shelf components, requires an identical setup for each secure device and requires minimal efforts from IT. Nothing is basically required on the server side so this gives minimal cost to a possible embodiment of this disclosure.

With this present disclosure adversaries are no longer in a position to copy large amounts of sensitive data, log keyboard typing or snapshot displayed sensitive data even if they gained access to the user system itself, or if they come from within the organization.

CONCLUSION, RAMIFICATIONS AND SCOPE

Accordingly, the reader will see that the disclosure of this invention provides a "parallel world" of security that isolates and protects data yet keeps it usable.

The solution described is seamless to the user yet the solution authenticates itself to the user to let the user know the accessed data is indeed secure. Therefore composing, editing and reading of secure data can be made with reassurance.

The usage of secure, protected data is transparent to the user and secure, protected data can be shared and safely sent to other users, yet for example unintended recipients cannot make use of secure data.

This solution can protect secure data even if an intrusion has already occurred, and protect the data even from an inside security data breach.

This solution protects various types of sensitive data such as documents, emails, code, images, videos; sensitive data entry such as credentials to a website; editing documents, composing emails; writing code; remote data usage etc.

Although the description above contains many specifications, these should not be constructed as limiting the scope of the invention but as merely providing illustrations of some exemplary embodiments of this invention.

For example, other means of hardware protection mechanisms may be used to implement this disclosure apart from the Analog Devices Lockbox securing technology. Lockbox is one technology that is used here to illustrate an embodiment of this disclosure; Other secret keys and types of keys symmetric and non symmetric may be used to implement security in this disclosure; Certificates may be used as an intermediate means of holding and updating secret keys for encrypting content; Other ways of splitting displayed data for secure and non secure contents may be used, the secure vault may be one unit with the secure environment or may even be in a single chip so that the secure device may be a single chip or unit, the secure device may be implemented as a part of another device and so on.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant secure devices and systems will be developed and the scope of the terms herein, particularly of the terms "user machine", "secure device", "secure vault", and "totem image" are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for handling secure data within a secure device through the control of a user machine, the system comprising:
   said secure device for handling secure data separately from said user machine;
   said user machine sending said secure device commands for use of said secure data wherein input keyboard data for use of said secure data does not pass through said user machine;
   a video combiner for displaying said user machine and said secure device on a display wherein at least part of said secure device display does not pass through said user machine and the location of at least part of said secure device display in said display is controllable by said user machine;
   whereby said user machine commands the use of said secure data without at least part of said secure device display passing through said user machine and without said secure data passing through said user machine keeping said secure data separate from said user machine.

2. The system of claim 1 further comprising a keyboard connection to said secure device wherein keyboard data to said secure device for entering secure data does not pass through said user machine whereby keyboard and display data of said secure device do not pass through said user machine.

3. The system of claim 1 wherein said secure device includes a secure vault for preventing said secure data from leaving said secure device in unsecured form.

4. A secure device for handling secure data for use with a user machine through the control of said user machine the secure device comprising:
- input for receiving commands from said user machine wherein input keyboard data for use of said secure data does not pass through said user machine;
- a secure environment for handling said secure data separately from said user machine;
- an output for display data for directly displaying said secure data together with user machine display data on a display using a video combiner wherein at least part of said output for display data does not pass through said user machine and the location of at least part of said output for display data in said display is controllable by said user machine;
- whereby said user machine commands the use of said secure data without at least part of said output display passing through said user machine and without said secure data passing through said user machine.

5. The secure device of claim 4 further comprising a keyboard connection to said secure device wherein keyboard data to said secure device for entering secure data does not pass through said user machine whereby keyboard and display data of said secure device do not pass through said user machine.

6. The secure device of claim 4 further comprising a secure vault for preventing said secure data from leaving said secure device in unsecured form.

7. A method of using secure data using a secure device through the use of a user machine the method comprising:
- a. requesting to use secure data through said user machine,
- b. using said requested secure data in said secure device according to said user machine command wherein input keyboard data for use of said secure data does not pass through said user machine,
- c. displaying output display of usage of said requested secure data handled in said secure device directly to said user without said output display passing through said user machine and location of at least part of said output display of usage of requested secure data in a display is controllable by said user machine.

8. A method according to claim 7 wherein input keyboard data to said secure device for using said requested secure data in said secure device does not pass through said user machine.

9. A method according to claim 7 wherein sharing of said requested secure data with another user takes place using said secure device for authorizing said secure data for use of another secure device belonging to said another user.

10. A method according to claim 9 wherein authentication of sender for user sharing secure data is achieved through the use of said secure device authorizing usage of secure data for a known user by a known user.

11. A method according to claim 7 wherein use of said requested secure data taking place on a cloud using secure device in said cloud for securely using data on the cloud.

12. A method according to claim 7 wherein use of said requested secure data belonging to a web form for filling data securely through a remote server.

13. A method according to claim 7 wherein use of said secure data belonging to a client application executing in the user machine for inserting data securely in said client application.

14. A method of using secure data using a secure device through the use of a user machine the method comprising:
- a. requesting to use secure data through said user machine,
- b. using said requested secure data in said secure device according to said user machine command,
- c. displaying output display of usage of said requested secure data handled in said secure device directly to said user without said output display passing through said user machine and location of at least part of said output display of usage of requested secure data in a display is controllable by said user machine,
- d. sharing of said requested secure data with another user using said secure device for authorizing said secure data for use of another secure device belonging to said another user.

15. A method according to claim 14 wherein authentication of sender for user sharing secure data is achieved through the use of said secure device authorizing usage of secure data for a known user by a known user.

16. A method according to claim 14 wherein authentication of said user sharing secure data is achieved through the use of said secure device wherein said secure device authorizing usage of said secure data for said another user by said user.

17. A method according to claim 14 wherein said another user requests to use said secure data through said another user machine wherein said another user using said requested secure data in said another secure device according to said another user machine commands.

18. A method of using secure data on a cloud using a secure device on the cloud through the use of a user machine the method comprising:
- a. requesting to use said secure data on a cloud through said user machine,
- b. using said requested secure data in said secure device on the cloud according to said user machine command,
- c. displaying output display of usage of said requested secure data handled in said secure device directly to said user without said output display passing through said user machine and location of at least part of said output display of usage of requested secure data in a display is controllable by said user machine.

19. A method according to claim 18 wherein authentication of said user sharing secure data is achieved through the use of said secure device wherein said secure device authorizing usage of said secure data for said cloud by said user.

20. A system for using secure data on a cloud using a secure device through the control of a user machine, the system comprising:
- said secure device for controlling said secure data on a cloud separately from said user machine;
- said user machine sending said secure device commands for use of said secure data on a cloud;
- a video combiner for displaying said user machine and said secure device on a display wherein at least part of said secure device display does not pass through said user machine and the location of at least part of said secure device display in said display is controllable by said user machine;
- whereby said user machine commands the use of said secure data on a cloud through the control of said secure device without at least part of said secure device display passing through said user machine and without said secure data passing through said user machine keeping said secure data separate from said user machine.

21. The system of claim 20 wherein authentication of said cloud for use of said secure data is achieved through the use of said secure device.

22. The system of claim 20 wherein authentication of said user making use of said secure data on a cloud is achieved through the use of said secure device.

23. The system of claim 20 wherein sharing of said secure data on a cloud with another user takes place using said secure device.

24. The system of claim 1 wherein input movement data for use of said secure data does not pass through said user machine.

25. The system of claim 1 wherein said secure device includes a secure vault for preventing data not handled by any other secure vault from entering said secure device.

26. The system of claim 1 wherein sharing of said secure data with another user takes place using said secure device for authorizing said secure data for use of another secure device belonging to said another user.

27. The system of claim 26 wherein authentication of said user sending said secure data is achieved through the use of said secure device.

28. The system of claim 1 wherein using of said secure data on a cloud takes place using said secure device on said cloud for securely using data on the cloud.

29. The system of claim 1 wherein using of said secure data for filling up a web form for sending said secure data to a remote server.

30. The system of claim 1 wherein using of said secure data belonging to a client application for inserting data securely in said client application.

31. The secure device of claim 4 wherein sharing of said secure data with another user takes place using said secure device for authorizing said secure data for use of another secure device belonging to said another user.

32. The secure device of claim 4 wherein authentication of said user sending said secure data is achieved through the use of said secure device.

33. The system of claim 4 wherein said secure device further comprising a secure vault for preventing data not handled by any secure vault from entering said secure device.

* * * * *